(12) United States Patent
Inoue et al.

(10) Patent No.: US 9,581,505 B2
(45) Date of Patent: Feb. 28, 2017

(54) SENSOR DEVICE

(71) Applicants: HONDA MOTOR CO., LTD., Minato-Ku, Tokyo (JP); NATIONAL UNIVERSITY CORPORATION KANAZAWA UNIVERSITY, Kanazawa-Shi, Ishikawa (JP)

(72) Inventors: Toshio Inoue, Wako (JP); Toshihiko Komatsuzaki, Kanazawa (JP)

(73) Assignees: Honda Motor Co., Ltd., Tokyo (JP); National University Corporation Kanazawa University, Ishikawa (JP)

( * ) Notice: Subject to any disclaimer, the term of this patent is extended or adjusted under 35 U.S.C. 154(b) by 0 days.

(21) Appl. No.: 14/899,496

(22) PCT Filed: May 14, 2014

(86) PCT No.: PCT/JP2014/002540
§ 371 (c)(1),
(2) Date: Dec. 17, 2015

(87) PCT Pub. No.: WO2014/203446
PCT Pub. Date: Dec. 24, 2014

(65) Prior Publication Data
US 2016/0153846 A1  Jun. 2, 2016

(30) Foreign Application Priority Data

Jun. 18, 2013 (JP) ................................. 2013-127265
Jun. 18, 2013 (JP) ................................. 2013-127266

(51) Int. Cl.
*G01L 1/22* (2006.01)
*G01L 1/12* (2006.01)
*G01L 1/20* (2006.01)

(52) U.S. Cl.
CPC .............. *G01L 1/2287* (2013.01); *G01L 1/12* (2013.01); *G01L 1/125* (2013.01); *G01L 1/20* (2013.01); *G01L 1/225* (2013.01)

(58) Field of Classification Search
CPC .......... C08L 45/00; G01L 1/2243; G01L 1/22; H01F 1/44
(Continued)

(56) References Cited

U.S. PATENT DOCUMENTS 4,448,059 A   5/1984  Kondo et al.
5,814,999 A   9/1998  Elie et al.
(Continued)

FOREIGN PATENT DOCUMENTS

CN   1402833 A   3/2003
CN   1957257 A   5/2007
(Continued)

OTHER PUBLICATIONS

Tian et al., "Study of magnetorheology and sensing capabilities of MR elastomers", Journal of Physics: Conference Series, Feb. 2013, vol. 412, 012037.
(Continued)

*Primary Examiner* — Lisa Caputo
*Assistant Examiner* — Octavia Hollington
(74) *Attorney, Agent, or Firm* — Carrier Blackman and Associates, P.C.; Joseph P. Carrier; Fulchand P. Shende

(57) ABSTRACT

The detection range and the detection precision of a sensor device that makes use of the deformation of a viscoelastic elastomer are made variable. The sensor device comprises a magnetic viscoelastic elastomer containing electroconductive magnetic particles dispersed therein so as to demonstrate an elastic modulus that varies depending on a magnetic field applied thereto and an electric resistance in a prescribed direction that varies depending on a deformation (Continued)

thereof, electromagnets for applying a magnetic field that can be varied to the magnetic viscoelastic elastomer, a resistance detection circuit for detecting the electric resistance of the magnetic viscoelastic elastomer, and a control unit for computing at least one of a deformation state of the magnetic viscoelastic elastomer and a load applied to the magnetic viscoelastic elastomer according to a detection value of the resistance detection circuit and a magnitude of the magnetic field applied by the electromagnets.

15 Claims, 10 Drawing Sheets

(58) Field of Classification Search
USPC .................................................... 73/862.632
See application file for complete search history.

(56) References Cited

U.S. PATENT DOCUMENTS

| | | | |
|---|---|---|---|
| 6,437,563 | B1 | 8/2002 | Simmonds et al. |
| 7,261,834 | B2 * | 8/2007 | Fuchs .................. F16F 1/3605 252/62.53 |
| 7,663,362 | B2 * | 2/2010 | Kishida .................. G01R 33/04 324/244 |
| 8,123,971 | B2 * | 2/2012 | Bose .......................... C08J 5/10 252/62.54 |
| 8,536,863 | B2 * | 9/2013 | Kishida .................. G01R 33/04 324/244 |
| 2008/0024118 | A1 | 1/2008 | Kahlman et al. |

FOREIGN PATENT DOCUMENTS

| | | |
|---|---|---|
| JP | S62-46222 A | 2/1987 |
| JP | S64-35332 A | 2/1989 |
| JP | H04-266970 A | 9/1992 |
| JP | H06-158911 A | 6/1994 |
| WO | 2004/065177 A1 | 8/2004 |

OTHER PUBLICATIONS

Li et al., "Development of a Force Sensor Working with MR Elastomers", 2009 IEEE/ASME International Conference on Advanced Intelligent Mechatronics, IEEE, 2009, pp. 233-238.

Office Action issued Oct. 9, 2016 in the corresponding Chinese Patent Application No. 201480034580.4.

* cited by examiner

SENSOR DEVICE

TECHNICAL FIELD

The present invention relates to a sensor device including a viscoelastic elastomer, a magnetic field application means and a magnetic field detection means, and in particular to a sensor device that uses a magnetic viscoelastic elastomer demonstrating a variable elastic modulus depending on the magnetic field applied thereto so that a measurement range can be changed depending on the magnetic field applied thereto.

BACKGROUND ART

A known pressure sensitive sensor (load sensor) includes a viscoelastic elastomer, a permanent magnet provided on one side of the viscoelastic elastomer and a Hall device provided on the opposite side of the viscoelastic elastomer. See Patent Document 1, for instance. When a pressure (load) is applied to this pressure sensitive sensor, the viscoelastic elastomer undergoes a deformation causing a change in the relative position between the permanent magnet and the Hall device so that the pressure applied to the viscoelastic elastomer can be determined from the detection value of the Hall device. In this pressure sensitive sensor, the detection range and the detection precision of the pressure is determined by the deformation property of the viscoelastic elastomer. For instance, when the viscoelastic elastomer has a relatively low elastic modulus, the detection precision (detection sensitivity) increases owing to the increased deformation of the viscoelastic elastomer, but the detection range narrows because the deformation limit of the viscoelastic elastomer is reached with a relatively low pressure. Conversely, when the viscoelastic elastomer has a relatively high elastic modulus, the detection range widens because the deformation limit of the viscoelastic elastomer is reached only with a relatively high pressure, but the detection precision (detection sensitivity) decreases owing to the reduced deformation of the viscoelastic elastomer.

Also is known the magnetic viscoelastic elastomer which internally contains magnetic particles dispersed therein. Owing to the property of the magnetic particles to polarize in a magnetic field, the elastic modulus of the viscoelastic elastomer can be varied by changing the magnetic field that is applied to the viscoelastic elastomer. See Patent Document 2, for instance.

PRIOR ART DOCUMENT(S)

Patent Document(s)

Patent Document 1: JPS62-046222A
Patent Document 2: JPH04-266970A

SUMMARY OF THE INVENTION

Task to be Accomplished by the Invention

In conjunction with the pressure sensitive sensor such as the one disclosed in Patent Document 1, it is desired to provide a sensor device that can vary the measurement precision and the measurement range thereof with the aim to cover a wide range of measurement objects. The inventors of this application have come to the recognition that such a sensor may be achieved by using a magnetic viscoelastic elastomer that contains magnetic particles therein so that the elastic modulus thereof can be changed depending on the magnitude of the magnetic field applied thereto. According to this arrangement, when the load applied to the sensor device is relatively large, the detection range can be widened by increasing the magnetic field applied thereto so as to increase the elastic modulus thereof. Conversely, when the load applied to the sensor device is relatively small, the detection precision can be increased by reducing the magnetic field applied thereto so as to decrease the elastic modulus thereof. However, in such a sensor device, because the magnetic field detected by the magnetic detection means such as a Hall device changes in response not only to the deformation of the magnetic viscoelastic elastomer but also to the magnitude of the magnetic field applied by the magnetic field application means, the deformation of the magnetic viscoelastic elastomer and the load applied to the magnetic viscoelastic elastomer cannot be computed simply from the magnitude of the magnetic field detected by the magnetic detection means. Also, combining a viscoelastic elastomer, a magnetic field application means and a magnetic field detection means presents a challenge in laying out these components.

The present invention was made in view of such problems of the prior art, and has a primary object to allow the detection range and the detection precision of a sensor device that makes use of the deformation of a viscoelastic elastomer to be varied as required.

Means to Accomplish the Task

To achieve such an object, the present invention provides a sensor device, comprising: a magnetic viscoelastic elastomer (2) containing electroconductive magnetic particles (15) dispersed therein so as to demonstrate an elastic modulus that varies depending on a magnetic field applied thereto and an electric resistance in a prescribed direction that varies depending on a deformation thereof; a magnetic field application means (5, 6) for applying a magnetic field that can be varied to the magnetic viscoelastic elastomer; a resistance detection means (35) for detecting the electric resistance of the magnetic viscoelastic elastomer; and a computation means (10) for computing a load applied to the magnetic viscoelastic elastomer according to a detection value of the resistance detection means and a magnitude of the magnetic field applied by the magnetic field application means, the computation means being configured such that the greater the magnitude of the magnetic field applied by the magnetic field application means is, the greater the value of the load computed from the detection value of the resistance detection means is.

Thereby, a sensor device that can change the detection range and the detection precision depending on the magnitude of the magnetic field applied by the magnetic field application means is provided. Because the electroconductive magnetic particles are dispersed in the magnetic viscoelastic elastomer, the magnetic particles are brought close to and away from one another depending on the deformation of the magnetic viscoelastic elastomer. Therefore, the load acting upon the magnetic viscoelastic elastomer can be detected from the electric resistance of the magnetic viscoelastic elastomer. Also, because the electroconductive magnetic particles form mutual magnetic couplings corresponding to the magnitude of the magnetic field applied by the magnetic field application means, the elastic modulus and the electric resistance of the magnetic viscoelastic elastomer are varied in a corresponding manner. When computing the load applied to the magnetic viscoelastic elastomer, the computation means takes into account not only the electric resistance of the magnetic viscoelastic elastomer detected by the resistance detection means but also the magnitude of the magnetic field applied by the magnetic field application means. Therefore, by taking into account the elastic modulus of the magnetic viscoelastic elastomer that changes in dependence on the magnetic field, the load applied to the magnetic viscoelastic elastomer can be computed from the electric resistance of the magnetic viscoelastic elastomer. Further, the load acting on the magnetic viscoelastic elastomer can be computed from the magnitude of the magnetic field applied by the magnetic field application means and the detection value of the resistance detection means. The greater the magnetic field applied by the magnetic field application means is, the smaller the deformation of the magnetic viscoelastic elastomer for a given load becomes. Therefore, the load can be computed in a favorable manner by increasing the magnitude of the computed load for a given detection value of the resistance detection means with an increase in the magnetic field applied by the magnetic field application means.

As an additional feature of the present invention, it may be arranged such that the resistance detection means includes a pair of electrodes (8, 9) each having a major surface perpendicular to a first direction and interposing the magnetic viscoelastic elastomer therebetween, the resistance detection means being configured to measure an electric resistance of the magnetic viscoelastic elastomer by conducting an electric current between the electrodes; and wherein the computation means is configured to determine that the magnetic viscoelastic elastomer has undergone a compressive deformation in the first direction when the electric resistance has decreased, and that the magnetic viscoelastic elastomer has undergone a tensile deformation in the first direction or a shear deformation along a plane perpendicular to the first direction when the electric resistance has increased.

According to this arrangement, the sensor device 1 is able to detect the direction of the applied load. When the magnetic viscoelastic elastomer undergoes a compressive deformation in the first direction, the electroconductive magnetic particles are brought close to one another in the first direction and form electroconductive paths by mutual contacts so that the electric resistance of the magnetic viscoelastic elastomer decreases. Conversely, when the magnetic viscoelastic elastomer undergoes a tensile deformation in the first direction, the electroconductive magnetic particles are brought away from one another in the first direction and extend or sever the electroconductive paths so that the electric resistance of the magnetic viscoelastic elastomer increases. Also, when the magnetic viscoelastic elastomer undergoes a shear deformation along a plane perpendicular to the first direction, the electroconductive magnetic particles are brought away from one another in the first direction and extend or sever the electroconductive paths so that the electric resistance of the magnetic viscoelastic elastomer increases. Thus, as the way the electric resistance increases and decreases changes depending on the direction of the load, the sensor device is able to detect the direction of the deformation and the direction of the load according to the electric resistance detected by the resistance detection means.

In the present invention, the sensor device may further comprise a limiting member (51) for limiting the shear deformation of the magnetic viscoelastic elastomer.

Thereby, the magnetic viscoelastic elastomer is prevented from undergoing a shear deformation so that when the electric resistance of the magnetic viscoelastic elastomer has increased, it can be concluded that the magnetic viscoelastic elastomer has undergone a tensile deformation in the first direction.

In the present invention, the sensor device may further comprise a magnetic field detection means (61) provided in the magnetic viscoelastic elastomer; wherein the magnetic field application means is positioned such that magnetic flux lines produced from the magnetic field application means is directed in the first direction; and wherein the computation means is configured to detect a shear deformation of the magnetic viscoelastic elastomer in a direction perpendicular to the first direction according to a detection value of the magnetic field detection means and a magnitude of the magnetic field applied by the magnetic field application means.

According to this arrangement, when placed under a shear load, the magnetic field detection means is caused to move in the shear direction owing to the shear deformation of the magnetic viscoelastic elastomer, and the magnitude of the detected magnetic field changes in a corresponding manner. Therefore, based on the detection value of the magnetic field detection means, it can be determined if the load acting on the sensor device (1) is a shear load.

In the present invention, the magnetic field application means may be configured to apply a magnetic field of a greater magnitude with an increase in a change in the detection value of the resistance detection means.

According to this arrangement, because the greater the change in the electric resistance detected by the resistance detection means is, the greater the deformation of the magnetic viscoelastic elastomer is, by increasing the magnitude of the magnetic field applied by the magnetic field application means, the elastic modulus of the magnetic viscoelastic elastomer can be made higher, and the deformation of the magnetic viscoelastic elastomer is controlled so that the detection range can be widened.

In the present invention, the magnetic field application means may be configured to apply a magnetic field of a greater magnitude with an increase in a deformation or a deformation speed of the magnetic viscoelastic elastomer computed by the computation means.

According to this arrangement, by increasing the magnitude of the magnetic field applied by the magnetic field application means in a manner corresponding to an increase in the deformation of the magnetic viscoelastic elastomer, the elastic modulus of the magnetic viscoelastic elastomer can be made higher, and the deformation of the magnetic viscoelastic elastomer is controlled so that the detection range can be widened.

According to a certain aspect of the present invention, the magnetic viscoelastic elastomer is interposed between a first member (31) and a second member (32), and the sensor device is configured to change the elastic modulus of the magnetic viscoelastic elastomer by controlling the magnetic field application means according to the load applied to the magnetic viscoelastic elastomer or a frequency of a vibration of the magnetic viscoelastic elastomer computed by the computation means so that a load or a vibration transmitted between the first and second members may be varied.

According to this arrangement, by measuring the load and the vibration that are transmitted between the first member and the second member while changing the elastic modulus of the magnetic viscoelastic elastomer, the sensor device may also be used as an actuator for controlling the vibration and the load. In other words, the sensor device may be constructed as a device performing the functions of both a sensor and an actuator.

In the present invention, the magnetic field application means may consist of an electromagnet.

Thereby, the sensor device can be constructed with a simple structure.

According to another aspect of the present invention, the sensor device comprises a magnetic viscoelastic elastomer (102) containing electroconductive magnetic particles (115) dispersed therein so as to demonstrate an elastic modulus that varies depending on a magnetic field applied thereto; a magnetic field application means (105, 106) for applying a magnetic field that can be varied to the magnetic viscoelastic elastomer; a magnetic field detection means (107) supported by the magnetic viscoelastic elastomer so as to change a position thereof relative to the magnetic field application means in dependence on a deformation of the magnetic viscoelastic elastomer; and a computation means (119) for computing at least one of a deformation state of the magnetic viscoelastic elastomer and a load applied to the magnetic viscoelastic elastomer according to a magnitude of the magnetic field detected by the magnetic field detection means and a magnitude of the magnetic field applied by the magnetic field application means. The "deformation state of the magnetic viscoelastic elastomer" as used herein may include the deformation, the deformation speed and the vibration frequency of the magnetic viscoelastic elastomer.

This arrangement provides a sensor device that can change the detection range and the detection precision depending on the magnitude of the magnetic field applied by the magnetic field application means. When computing at least one of the deformation state of the magnetic viscoelastic elastomer and the load applied to the magnetic viscoelastic elastomer, the computation means takes into account not only the magnetic field detected by the magnetic field detection means but also the magnetic field applied by the magnetic field application means. Therefore, also by changing the magnitude of the magnetic field applied by the magnetic field application means to change the elastic modulus of the magnetic viscoelastic elastomer, and eliminating the influence of the change in the magnetic field caused by the magnetic field application means on the magnitude of the magnetic field detected by the magnetic field application means, the computation means is able to compute at least one of the deformation state of the magnetic viscoelastic elastomer and the load applied to the magnetic viscoelastic elastomer.

In the present invention, the computation means may be configured to increase a value of the computed load for a given detection value of the magnetic field detection means with an increase in the magnitude of the magnetic field applied by the magnetic field application means.

Thereby, the load acting upon the magnetic viscoelastic elastomer can be computed from the magnitude of the magnetic field applied by the magnetic field application means and the detection value of the magnetic field detection means. Because the elastic modulus of the magnetic viscoelastic elastomer increases and the deformation of the magnetic viscoelastic elastomer for a given load decreases with an increase in the magnitude of the magnetic field applied by the magnetic field application means, by increasing the load that is computed from the detection value of the magnetic field detection means corresponding to the detection value of the magnetic field detection means with an increase in the magnitude of the magnetic field applied by the magnetic field application means, the load can be computed in an appropriate manner.

In the present invention, the computation means may be configured to increase the magnetic field applied by the magnetic field application means with an increase in a change of the magnetic field detected by the magnetic field detection means.

According to this arrangement, because the greater the change in the magnetic field detected by the magnetic field detection means is, the greater the deformation of the magnetic viscoelastic elastomer becomes. Therefore, by increasing the elastic modulus of the magnetic viscoelastic elastomer by increasing the magnetic field applied by the magnetic field application means, the deformation of the magnetic viscoelastic elastomer is controlled so that the detection range can be widened.

In the present invention, the computation means may be configured to increase the magnetic field applied by the magnetic field application means with an increase in the deformation or a deformation speed of the magnetic viscoelastic elastomer computed by the computation means.

According to this arrangement, by increasing the magnitude of the magnetic field applied by the magnetic field application means with an increase in the deformation or the deformation speed of the magnetic viscoelastic elastomer, the deformation of the magnetic viscoelastic elastomer is controlled so that the detection range can be widened.

According to a certain aspect of the present invention, the magnetic viscoelastic elastomer is interposed between a first member (131) and a second member (132), and the computation means is configured to change the elastic modulus of the magnetic viscoelastic elastomer by controlling the magnetic field application means according to at least one of the load applied to the magnetic viscoelastic elastomer, the deformation of the magnetic viscoelastic elastomer and a deformation speed of the magnetic viscoelastic elastomer computed by the computation means so that a load or a vibration transmitted between the first and second members may be varied.

Owing to this arrangement, the sensor can not only allow the load or the vibration that is transmitted between the first member and the second member to be measured but also can function as an actuator for controlling the vibration and the load by changing the elastic modulus of the magnetic viscoelastic elastomer. In other words, the sensor device may be constructed as a device that can perform the functions of both a sensor and an actuator.

In a certain aspect of the present invention, the magnetic field application means consists of an electromagnet (105, 106), and the magnetic field detection means is a Hall device (107) supported within the magnetic viscoelastic elastomer.

Thereby, the sensor device can be constructed with a highly simple structure.

The sensor device of the present invention may further comprise a non-magnetic member positioned between the electromagnet and the Hall device so that magnetic flux lines directed from the electromagnet to the Hall device are at least partly obstructed, and a relative position between the non-magnetic member and the Hall device changes by a deformation of the magnetic viscoelastic elastomer.

Because the non-magnetic member is positioned so that magnetic flux lines directed from the electromagnet to the Hall device are at least partly obstructed, when any change occurs to the magnetic viscoelastic elastomer, the relative position between the non-magnetic member and the Hall device is changed, and the area by which the non-magnetic member covers the Hall device changes. Therefore, when any change has occurred to the magnetic viscoelastic elastomer, the changes in the magnetic field detected by the Hall device increases so that the detection precision of the sensor device increases.

Effect of the Invention

According to the structure discussed above, the sensor device that makes use of the deformation of a magnetic viscoelastic elastomer can change the detection range and the detection precision.

DESCRIPTION OF THE PREFERRED EMBODIMENT(S)

Preferred embodiments of the present invention are described in the following with reference to the appended drawings.

First Embodiment

Figure 1:
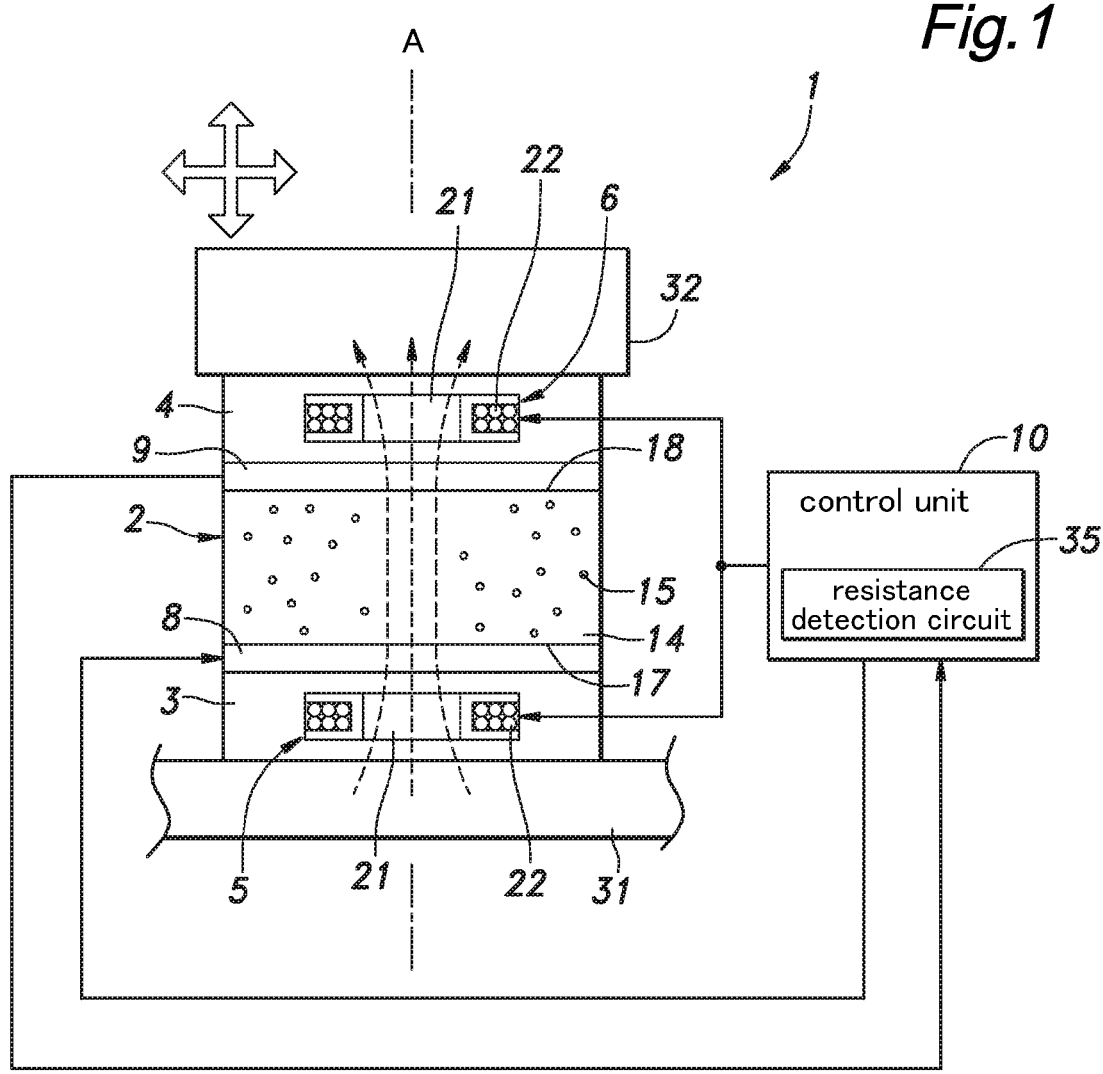
FIG. 1 is a diagram showing a sensor device given as a first embodiment of the present invention.
Figure 2:
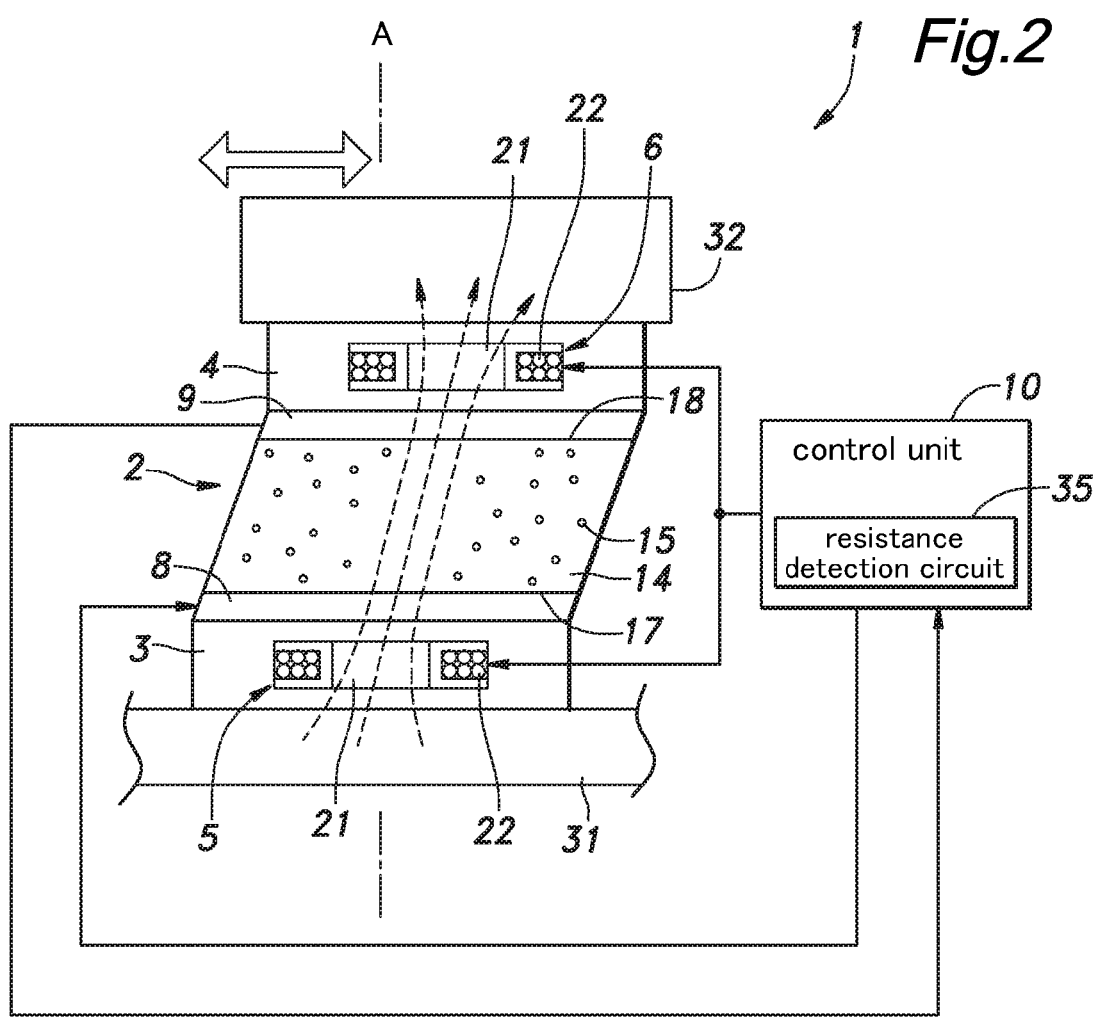
FIG. 2 is a diagram showing the sensor device of the first embodiment under loading.

FIG. 1 is a diagram showing a sensor device given as a first embodiment of the present invention, and FIG. 2 is a diagram showing the sensor device of the first embodiment under loading. As shown in FIGS. 1 and 2, the sensor device 1 comprises a magnetic viscoelastic elastomer 2, a first electrode plate 8 and a second electrode plate 9 interposing the magnetic viscoelastic elastomer 2 therebetween, a first plate 3 provided on an outer side of the first electrode plate 8, a second plate 4 provided on the outer side of the second electrode plate 9, a first electromagnet 5 and a second electromagnet 6 serving as magnetic field application means provided in the first plate 3 and the second plate 4, respectively, and a control unit 10.

The magnetic viscoelastic elastomer 2 comprises a matrix elastomer 14 having a prescribed viscoelastic property and magnetic particles 15 dispersed in the matrix elastomer 14. The matrix elastomer 14 may consist of a per se known high polymer material having a viscoelastic property at room temperature such as ethylene-propylene rubber, butadiene rubber, isoprene rubber and silicone rubber. The matrix elastomer 14 is preferably provided with a high electrical resistivity so as to demonstrate an electrically insulating property. The matrix elastomer 14 is provided with a central axial line A, a first major surface 17 perpendicular to the central axial line A and defined on an exterior surface thereof and a second major surface 18 parallel to the first major surface 17 and defined on an opposite exterior surface thereof. The matrix elastomer 14 may be given with any shape such as a rectangular parallelepiped shape and a cylindrical shape. The first major surface 17 and the second major surface 18 consist of a pair of mutually opposing surfaces when the matrix elastomer 14 is given with a rectangular parallelepiped shape, and consist of two end surfaces perpendicular to the axial line when the matrix elastomer 14 is given with a cylindrical shape.

The magnetic particles 15 have a property to be magnetically polarized under the action of a magnetic field, and may consist of per se known metals such as pure iron, soft electromagnetic iron, anisotropic silicon steel, Mn—Zn ferrite, Ni—Zn ferrite, magnetite, cobalt and nickel, per se known organic materials such as 4-methoxybenzylidien-4-acetoxyaniline and triaminobenzene polymer, or per se known organic/inorganic composite materials such as anisotropic plastic having ferrite particles dispersed therein. The possible shapes of each magnetic particle 15 may include but not limited to nodular, capillary and flaky shapes. The sizes of the magnetic particles 15 may range between 0.01 μm to 500 μm although the present invention is not limited by such a range.

The magnetic particles 15 in the matrix elastomer 14 are subjected to a relatively small mutual interaction in absence of a magnetic field, but are subjected to a relatively strong mutual gravitational pull when placed in a magnetic field. Typically, the magnetic particles 15 are dispersed in the matrix elastomer 14 in such a manner that the contact between the magnetic particles 15 is insignificant when no magnetic field is applied thereto, but a heavier mutual contact occurs between the magnetic particles 15 owing to the magnetic coupling between the magnetic particles 15 when a magnetic field is applied thereto. The magnetic particles 15 may be dispersed so as not to contact one another, or so as to form partly continuous chains when not placed in a magnetic field. The ratio of the volume of the magnetic particles 15 to that of the matrix elastomer 14 may be selected freely, but may range between 5% to 60% by volume. The magnetic particles 15 may be evenly dispersed in the matrix elastomer 14, or may be dispersed unevenly such that localized high density or low density regions may be created.

The first electrode plate 8 and the second electrode plate 9 each consist of a plate shaped electrode. A major surface of the first electrode plate 8 is bonded to the first major surface 17 of the magnetic viscoelastic elastomer 2, and the major surface of the second electrode plate 9 is bonded to the second major surface 18 of the magnetic viscoelastic elastomer 2, by using a bonding agent in each case. Therefore, the magnetic viscoelastic elastomer 2 is interposed between the first electrode plate 8 and the second electrode plate 9.

The first plate 3 and the second plate 4 are made of non-magnetic material. The second plate 4 is bonded to the outer surface of the first electrode plate 8, and the second plate 4 is bonded to the outer surface of the second electrode plate 9. Thereby, the magnetic viscoelastic elastomer 2 is interposed between the first electrode plate 8 and the second electrode plate 9, and this assembly is in turn interposed between the first plate 3 and the second plate 4. In other words, the first plate 3, the first electrode plate 8, the magnetic viscoelastic elastomer 2, the second electrode plate 9 and the second plate 4 are laminated in that order in the axial direction A.

The first electromagnet 5 and the second electromagnet 6 are each provided with an iron core 21 and a coil 22 wound around the outer circumference of the iron core 21. The first electromagnet 5 and the second electromagnets 6 are provided centrally in the first plate 3 and the second plate 4, respectively, so that the axial line of the coils 22 extend perpendicularly to the major surfaces of the first plate 3 and the second plate 4. Furthermore, the first electromagnet 5 and the second electromagnets 6 are positioned such that the axial line of the coils 22 coincide with the axial line A of the magnetic viscoelastic elastomer 2. In the illustrated embodiment, the first plate 3 and the second plate 4 are molded from plastic material such that the first electromagnet 5 and the second electromagnets 6 are insert molded in the first plate 3 and the second plate 4, respectively, during the molding process. In an alternate embodiment, each plate 3, 4 is formed as a hollow box member, and each electromagnet 5, 6 is thereafter placed in the interior of the corresponding plate member 3, 4. The lead wires of the coils 22 of the electromagnets 5 and 6 extend out of the plate members 3, 4.

By energizing the first electromagnet 5 and the second electromagnet 6, a magnetic field is produced in the magnetic viscoelastic elastomer 2. In this magnetic field, the magnetic flux lines (indicated by the broken lines in FIG. 1) are directed from the first electromagnet 5 of the first plate 3 to the second electromagnet 6 of the second plate 4. The magnetic field (applied magnetic field Bi) produced by the first electromagnet 5 and the second electromagnet 6 increases in intensity (magnetic flux density) in proportion to the electric current Ii conducted through the first electromagnet 5 and the second electromagnet 6. The greater the electric current is, the greater the magnitude of the magnetic field (magnetic flux density) becomes.

When a magnetic field is applied to the magnetic viscoelastic elastomer 2 by energizing the electromagnets 5 and 6, the magnetic particles 15 are magnetically polarized and caused to form magnetic couplings. For instance, the magnetic particles 15 may couple with one another into chains so as to form a network structure, and this causes the apparent elastic modulus (stiffness) of the magnetic viscoelastic elastomer 2 to be greater than the intrinsic elastic modulus (stiffness) of the matrix elastomer 14. The greater the magnetic field applied to the magnetic viscoelastic elastomer 2 is, the greater the magnetic attraction between the magnetic particles 15 becomes, and the greater the elastic modulus of the magnetic viscoelastic elastomer 2 becomes. The greater the magnetic field (applied magnetic field Bi) that is applied to the magnetic viscoelastic elastomer 2 is, or the greater the electric current (Ii) supplied to the electromagnets 5 and 6 is, the greater the elastic modulus of the magnetic viscoelastic elastomer 2 becomes, and the less deformable the magnetic viscoelastic elastomer 2 becomes.

When a magnetic field is applied to the magnetic viscoelastic elastomer 2, a magnetic coupling corresponding to the magnitude of the magnetic field is caused between the magnetic particles 15 so that a network structure (chain structure) is created. Because the network structure of the magnetic particles provides electric conductance paths, this causes the electric resistance R of the magnetic viscoelastic elastomer 2 to drop. The stronger the applied magnetic field Bi is, the more strongly the magnetic coupling between the magnetic particles 15 is promoted, and the lower the electric resistance R drops.

The first plate 3 of the sensor device 1 is fixedly attached to a base 31, and the second plate 4 thereof is fixedly attached to a measurement object 32. When a shear load F (directed along a plane perpendicular to the axial line A) is applied to the second plate 4 by the measurement object 32 as shown in FIG. 2, the sensor device 1 allows the magnitude of the load F and the deformation X of the magnetic viscoelastic elastomer 2 to be detected. This also means that the change rate of the load F, the change rate of the load F caused by the deformation X, the deformation rate V of the magnetic viscoelastic elastomer 2 and the frequency of the vibrations of the magnetic viscoelastic elastomer 2 can be detected.

The control unit 10 may be constructed by a microprocessor, or an LSI device or any other integrated electronic device incorporated with ROM and RAM. The control unit 10 is connected to the first and second electromagnets 5 and 6 and the first and second electrode plates 8 and 9. The control unit 10 supplies electric power to the first and second electromagnets 5 and 6, and can change the magnitude of the magnetic field (magnetic flux density) produced by the first and second electromagnets 5 and 6 by changing the electric current Ii supplied to these electromagnets 5 and 6. The electric current Ii supplied to the electromagnets 5 and 6 may be changed in a stepwise manner, or in a continuous manner. In the illustrated embodiment, the control unit 10 is configured to change the electric current Ii in three levels, small, medium and large, and the magnetic field (applied magnetic field Bi) produced by the electromagnets 5 and 6 can be changed in three levels, small, medium and large, in a manner corresponding to the electric current supplied thereto. When the control unit 10 is configured to change the electric current Ii supplied to the electromagnets 5 and 6 in a continuous manner, the magnetic field (applied magnetic field Bi) produced by the electromagnets 5 and 6 can be computed from the electric current Ii supplied to the electromagnets 5 and 6.

The control unit 10 supplies electric power to an electric circuit including the first electrode plate 8, the magnetic viscoelastic elastomer 2 and the second electrode plate 9. The control unit 10 is additionally provided with a resistance detection means in the form of a resistance detection circuit 35 for measuring the electric resistance between the first electrode plate 8 and the second electrode plate 9. The resistance detection circuit 35 is configured to measure the electric resistance between the first electrode plate 8 and the second electrode plate 9 or the electric resistance R of the magnetic viscoelastic elastomer 2.

The control unit 10 is configured to look up a prescribed map based on the electric resistance R and the applied magnetic field Bi so as to compute the deformation X of the magnetic viscoelastic elastomer 2, the load F applied to the magnetic viscoelastic elastomer 2 and the frequency of the vibration of the magnetic viscoelastic elastomer 2. When computing the deformation and other variables of the magnetic viscoelastic elastomer 2, the control unit 10 may use, instead of the applied magnetic field Bi. the electric current Ii supplied to the electromagnets 5 and 6 which is correlated to the applied magnetic field Bi.

Figure 3:
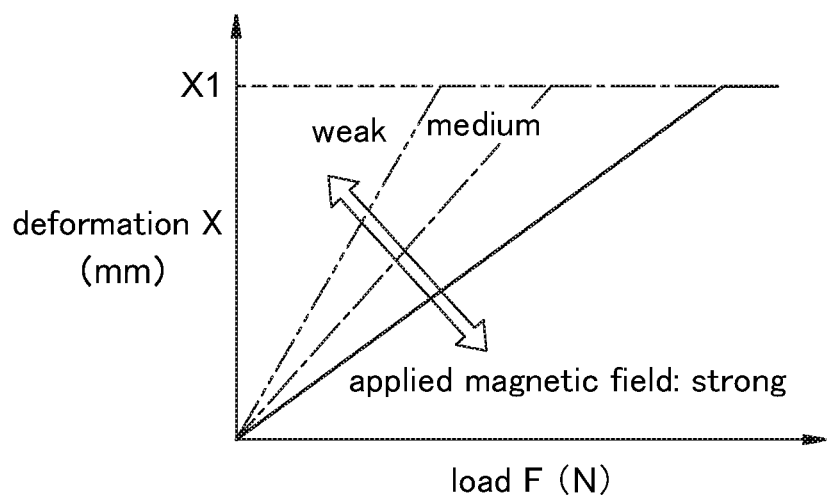
FIG. 3 is a graph showing the relationship between the applied magnetic field, the load and the deformation in the sensor device of the first embodiment.

FIG. 3 is a graph showing the relationship between the applied magnetic field, the load and the deformation in the sensor device 1 of the first embodiment, and in particular shows the changes in the deformation X of the magnetic viscoelastic elastomer 2 for each given load F under different applied magnetic fields Bi. As the applied magnetic field Bi changes, the degree of magnetic coupling between the magnetic particles 15 changes, and this causes the elastic modulus of the magnetic viscoelastic elastomer 2 to change in a corresponding manner. The stronger the applied magnetic field Bi is, the greater the magnetic coupling between the magnetic particles 15 becomes, and the greater the elastic modulus of the magnetic viscoelastic elastomer 2 becomes. Thus, as shown in FIG. 3, as the applied magnetic field Bi is increased, the deformation X of the magnetic viscoelastic elastomer 2 for a given change in the load F decreases. Therefore, the weaker the applied magnetic field Bi is, the smaller the load under which a deformation limit value X1 is reached becomes. The deformation limit value X1 as used herein means a value of the deformation beyond which the linearity in the relationship between the load F and the deformation X is lost. It is desirable that the sensor device 1 operates in the range where the deformation X of the magnetic viscoelastic elastomer 2 is within the deformation limit value X1.

The electric resistance R of the magnetic viscoelastic elastomer 2 when no deformation is caused to the magnetic viscoelastic elastomer 2 is given as an initial electric resistance Ri (Ri1, Ri2 and Ri3, the initial electric resistance Ri varying in dependence on the applied magnetic field Bi as will be described hereinafter). When the magnetic viscoelastic elastomer 2 undergoes a compressive deformation in the direction of the axial line A, the magnetic particles 15 dispersed therein form electroconductive paths so that the electric resistance R decreases beyond the initial electric resistance Ri. The greater the compressive deformation X is, the closer the magnetic particles 15 are brought to one another. As a result, the electroconductive paths in the form of a network structure (chain structure) are created in a more active manner so that the electric resistance R decreases even further. Conversely, when the magnetic viscoelastic elastomer 2 undergoes a tensile deformation in the direction of the axial line A, the magnetic particles 15 dispersed therein are separated from one another so as to extend or sever the electroconductive paths with a result that the electric resistance R increases beyond the initial electric resistance Ri. Similarly, when the magnetic viscoelastic elastomer 2 undergoes a shear deformation along a plane perpendicular to the axial line A, the magnetic particles 15 dispersed therein are separated from one another so as to extend or sever the electroconductive paths with a result that the electric resistance R increases beyond the initial electric resistance Ri. The greater the tensile deformation X or the shear deformation is, the more separated or disrupted the electroconductive paths become, and the further the electric resistance R increases. Therefore, it can be determined that the magnetic viscoelastic elastomer 2 has undergone a compressive deformation (has been placed under a compressive load) in the direction of the axial line A from the initial zero deformation condition when the electric resistance R decreases from the initial electric resistance Ri, and that the magnetic viscoelastic elastomer 2 has undergone a tensile deformation (has been placed under a tensile load) in the direction of the axial line A or a shear deformation (has been placed under a shear load) from the initial zero deformation condition has occurred when the electric resistance R increases from the initial electric resistance Ri.

In the illustrated embodiment, the applied magnetic field Bi can be changed in three levels, weak, medium and strong, and the control unit 10 is incorporated with deformation maps defining the relationship between the electric resistance R and the deformation X of the magnetic viscoelastic elastomer 2 for three different levels of the applied magnetic field Bi. The control unit 10 computes the deformation X of the magnetic viscoelastic elastomer 2 by looking up the deformation map according to the applied magnetic field Bi and the electric resistance R. The deformation map is configured, for instance, such that the compressive deformation X in the direction of the axial line A becomes greater with a decrease in the electric resistance R from the initial electric resistance, and the tensile deformation or the shear deformation in the direction of the axial line A becomes smaller with an increase in the electric resistance R from the initial electric resistance.

As can be seen from FIG. 3, the load F acting upon the magnetic viscoelastic elastomer 2 is correlated to the deformation X of the magnetic viscoelastic elastomer 2 and the magnetic field Bi in a certain way. Because the applied magnetic field Bi can be varied in three levels, weak, medium and strong, the control unit 10 of the illustrated embodiment is provided with three load maps defining the relationship between the deformation X of the magnetic viscoelastic elastomer 2 and the load F acting upon the magnetic viscoelastic elastomer 2 in a corresponding manner. The control unit 10 computes the load F acting upon the magnetic viscoelastic elastomer 2 by looking up one of the load maps according to the applied magnetic field Bi and the deformation X of the magnetic viscoelastic elastomer 2. The load maps are typically configured such that the load F increases with an increase in the deformation X, and the load F for a given deformation increases with an increase in the applied magnetic field Bi.

The control unit 10 can obtain the deformation speed V of the magnetic viscoelastic elastomer 2 by differentiating the computed deformation X, and can determine the frequency v of the vibration of the magnetic viscoelastic elastomer 2 from the deformation speed V. The control unit 10 can also determine the change rate of the load F and the frequency of the change in the load F according to the detected load F.

The control unit 10 is also configured to adjust the applied magnetic field Bi according to the deformation X of the magnetic viscoelastic elastomer 2. For instance, when the deformation X is relatively large, the electric current Ii supplied to the electromagnets 5 and 6 is increased in order to strengthen the magnetic field Bi and thereby increase the elastic modulus of the magnetic viscoelastic elastomer 2. As a result, the deformation X is prevented from readily reaching the deformation limit value X1 so that a relatively large load F can be measured. In other words, the detection range (measurement range) of the sensor device 1 is expanded. When the deformation X is relatively small, the control unit 10 weakens the applied magnetic field Bi so that the elastic modulus of the magnetic viscoelastic elastomer 2 is reduced. As a result, the magnetic viscoelastic elastomer 2 is caused to deform more readily even when the load F applied thereto is relatively small so that the changes in the electric resistance R for a given load F can be increased, and the detection precision (sensitivity) increases. Thus, the sensor device 1 can change the detection range and the detection sensitivity depending on the deformation X of the magnetic viscoelastic elastomer 2 and the applied load F.

The adjustment of the detection range and the detection sensitivity of the sensor device 1 can also be based on the deformation speed V of the magnetic viscoelastic elastomer 2 and/or the change or the change rate of the electric resistance R, instead of the deformation X of the magnetic viscoelastic elastomer 2. The greater the deformation speed V of the magnetic viscoelastic elastomer 2 is, or the greater the change rate (change speed) of the electric resistance R is, the greater the applied magnetic field Bi should be, or the greater the elastic modulus of the magnetic viscoelastic elastomer 2 should be made.

The sensor device 1 having the structure discussed above can also be used as an actuator for reducing the vibrations of the measurement object 32 by changing the elastic modulus of the magnetic viscoelastic elastomer 2 according to the computed load F and the vibration frequency v of the magnetic viscoelastic elastomer 2 computed from the change rate of the load F. For instance, by changing the elastic modulus of the magnetic viscoelastic elastomer 2, the spring constant or the resonant vibration frequency of the spring mass system of the assembly consisting of the base 31, the sensor device 1 and the measurement object 32 can be changed so that the vibration of the spring mass system can be controlled. In such a case, the sensor device 1 may be configured such that the elastic modulus of the magnetic viscoelastic elastomer 2 is changed in the direction to lower the frequency v of the vibration according to the vibration frequency v detected by the sensor device 1.

Thus, the sensor device 1 of the illustrated embodiment can perform the functions of a sensor and an actuator. Normally, actuators and sensors are constructed from different component parts, but by using the magnetic viscoelastic elastomer 2 and the electromagnets 5 and 6 as common component parts to both a sensor and an actuator, the number of the component parts of the sensor device 1 can be reduced, and the sensor device 1 can be constructed as a compact unit.

As the sensor device 1 uses a magnetic viscoelastic elastomer 2 as a main component, the sensor device 1 can be conveniently incorporated or substituted in devices which use a viscoelastic elastomer as a buffering or shock absorbing component.

The sensor device 1 having the structure discussed above can be used as an engine mount interposed between a vehicle body frame and an engine, and a bush interposed between a suspension arm and a knuckle supporting a wheel. For instance, the base 31 may be attached to the vehicle body frame or the suspension arm, and the measurement object 32 may consist of a part of the engine or the knuckle. When the sensor device 1 is used as an engine mount, the sensor device 1 may be configured to change the elastic modulus of the magnetic viscoelastic elastomer 2 so as to control the vibrations of the engine by detecting the vibrations of the engine. When the sensor device 1 is applied to a tubular bush, the magnetic viscoelastic elastomer 2 is formed as a tubular member, and the first plate 3 may be formed as an outer tube fitted onto the outer circumferential surface of the magnetic viscoelastic elastomer 2 while the second plate 4 is formed as an inner tube fitted into the inner circumferential surface of the magnetic viscoelastic elastomer 2.

Second Embodiment

Figure 4:
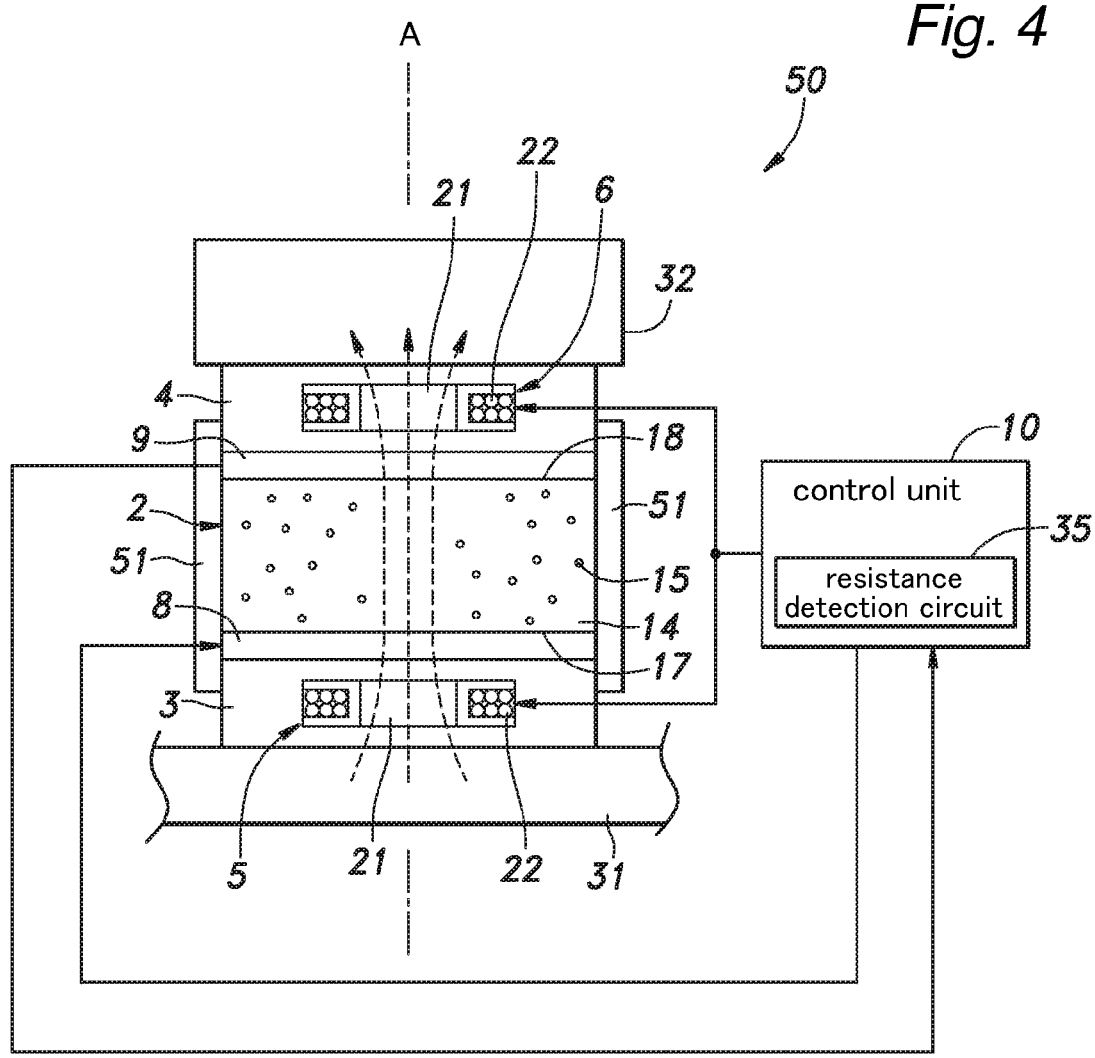
FIG. 4 is a diagram showing a sensor device given as a second embodiment of the present invention.

FIG. 4 is a diagram showing a sensor device 50 given as a second embodiment of the present invention. The sensor device 50 of the second embodiment differs from the sensor device 1 of the first embodiment in having a stopper 51, but is otherwise similar to the sensor device 1 of the first embodiment. In the description of the sensor device 50 of the second embodiment, the parts corresponding to those of the sensor device 1 of the first embodiment are denoted with like numerals without necessarily repeating the description of such parts.

As shown in FIG. 4, the sensor device 50 is provided with a pair of stoppers 51 on either side of the first plate 3. Each stopper 51 is attached to the corresponding side of the first plate 3, and extends in parallel with the axial line A so as to slidably engage the corresponding side of the second plate 4. Thereby, the second plate 4 is moveable in the direction of the axial line A, but is prevented from undergoing a shear deformation in a plane perpendicular to the axial line A.

In this arrangement, because the sensor device 50 is prevented from undergoing a shear deformation, when the electric resistance R is greater than the initial resistance Ri, it can be concluded that the magnetic viscoelastic elastomer 2 has undergone a tensile deformation (the loading consists of a tensile load). In other words, by restricting the direction of deformation to the compressive and/or tensile direction, the direction or mode of deformation can be determined.

Third Embodiment

Figure 5:
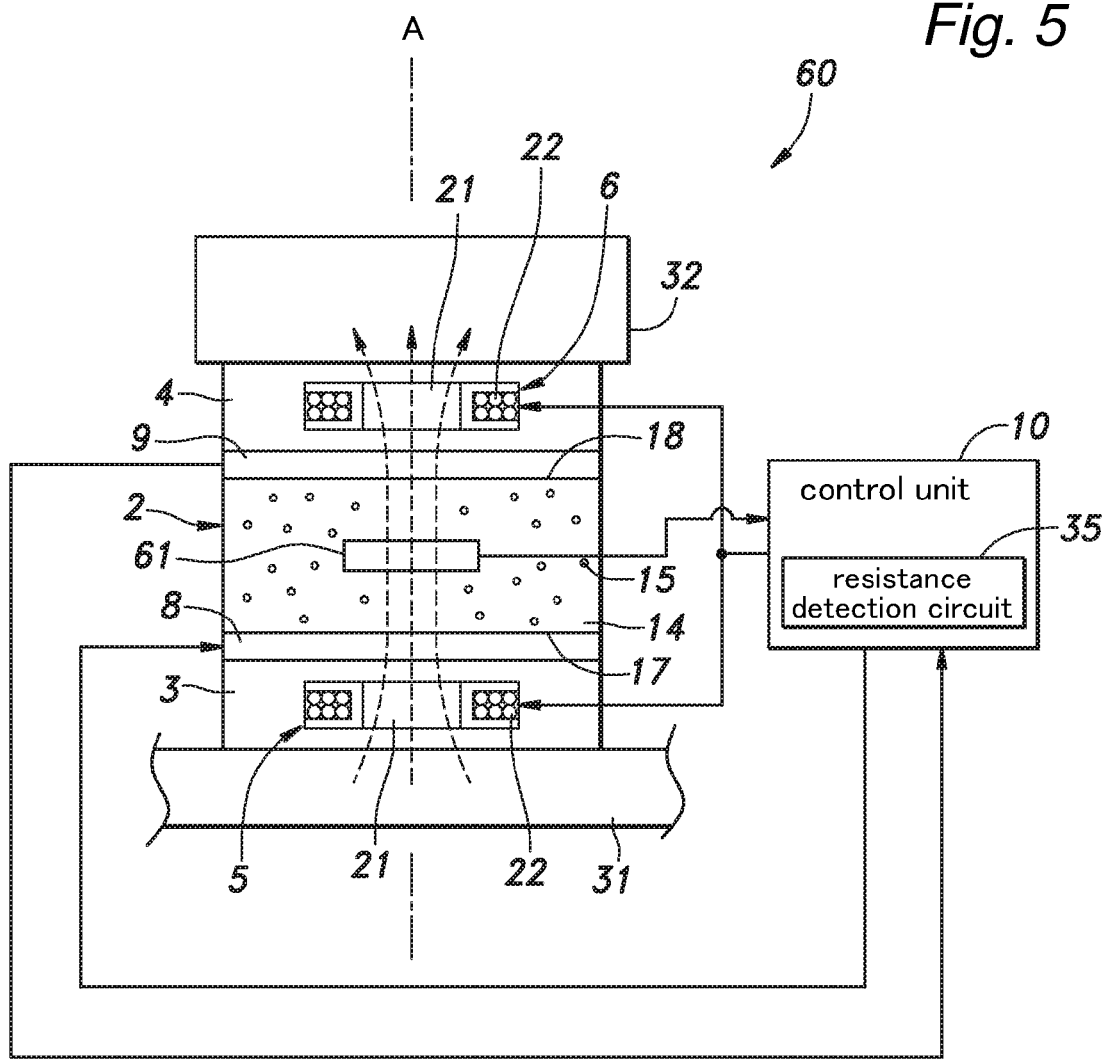
FIG. 5 is a diagram showing a sensor device given as a third embodiment of the present invention.

FIG. 5 is a diagram showing a sensor device 60 given as a third embodiment of the present invention. The sensor device 60 of the third embodiment differs from the sensor device 1 of the first embodiment in additionally having a Hall device 61 as a magnetic detecting means, but is otherwise similar to the sensor device 1 of the first embodiment. In the description of the sensor device 60 of the third embodiment, the parts corresponding to those of the sensor device 1 of the first embodiment are denoted with like numerals without necessarily repeating the description of such parts.

The Hall device 61 consists of a per se known magnetic sensor for detecting a magnetic field by using the Hall effect. The Hall device 61 consists of a thin-film semiconductor device, and includes an input terminal for supplying and conducting a control current Ic along a major surface in a first direction and an output terminal for receiving an output voltage Vo along the major surface in a second direction perpendicular to the first direction. When subjected to a magnetic field passing substantially perpendicular to the major surface 19, an output voltage Vo proportional to the magnetic flux of the magnetic field and the control current Ic is produced from the output terminal.

The Hall device 61 is buried in the central part of the magnetic viscoelastic elastomer 2 such that the major surface 19 thereof extends in parallel with the first and second major surfaces 17 and 18. In other words, the Hall device 61 is positioned such that the axial line A passes through the major surface 19 of the Hall device 61. The Hall device 61 is thus retained in the magnetic viscoelastic elastomer 2. The wiring connected to the input and output terminals of the Hall device 61 extends in parallel with the first and second major surfaces 17 and 18, and is drawn out from a side end of the magnetic viscoelastic elastomer 2.

The control unit 10 not only supplies the control current Ic to the Hall device 61 but also receives the output voltage Vo from the Hall device 61. The control unit 10 computes the magnetic field (detected magnetic field Bd) that is applied to the Hall device 61 from the control current Ic and the output voltage Vo.

The Hall device 61 produces an output voltage Vo which corresponds to the magnitude of the magnetic field (detected magnetic field Bd) at the position thereof. Suppose that the magnetic viscoelastic elastomer 2 is subjected to a constant magnetic field (applied magnetic field Bi) generated by the electromagnets 5 and 6, and a load F is applied to the magnetic viscoelastic elastomer 2 via the second plate 4. The resulting deformation of the magnetic viscoelastic elastomer 2 causes the position of the Hall device 61 relative to the electromagnets 5 and 6 to change, and this in turn causes the number of the magnetic flux lines passing through the Hall device 61 to change in a corresponding manner so that the output voltage Vo of the Hall device 61 or the magnitude of the magnetic field (detected magnetic field Bd) detected by the Hall device 61 changes in a corresponding manner. Therefore, based on the changes in the detected magnetic field Bd (output voltage Vo) detected by the Hall device 61, the deformation X of the magnetic viscoelastic elastomer 2 and the load F acting upon the magnetic viscoelastic elastomer 2 can be computed. In the illustrated embodiment, because the Hall device 61 is located in the central part of the magnetic viscoelastic elastomer 2 on the axial line A such that the axial line of the electromagnets 5 and 6 (the coils 22 thereof) coincides with the axial line A in the neutral condition, as the magnetic viscoelastic elastomer 2 undergoes a shear deformation, the Hall device 61 deviates from the axial line of the electromagnets 5 and 6, and the detected magnetic field Bd decreases in a progressive manner.

The Hall device 61 thus allows the shear deformation of the magnetic viscoelastic elastomer 2 to be detected. Therefore, based on the detection value from the Hall device 61, the control unit 10 can determine if the magnetic viscoelastic elastomer 2 has undergone a tensile deformation in the direction of the axial line A or a shear deformation when the electric resistance R increases from the initial electric resistance Ri owing to the deformation of the magnetic viscoelastic elastomer 2.

Once the mode of deformation of the magnetic viscoelastic elastomer 2 is determined from the detection value of the Hall device 61, similarly as in the case of the first embodiment, the sensor device 60 computes the deformation X of the magnetic viscoelastic elastomer 2 and the load F acting thereon from the applied magnetic field Bi and the electric resistance R. It is also possible to compute the shear deformation X of the magnetic viscoelastic elastomer 2 and the load F acting thereon from the detected magnetic field Bd and the applied magnetic field Bi.

Fourth Embodiment

Figure 6:
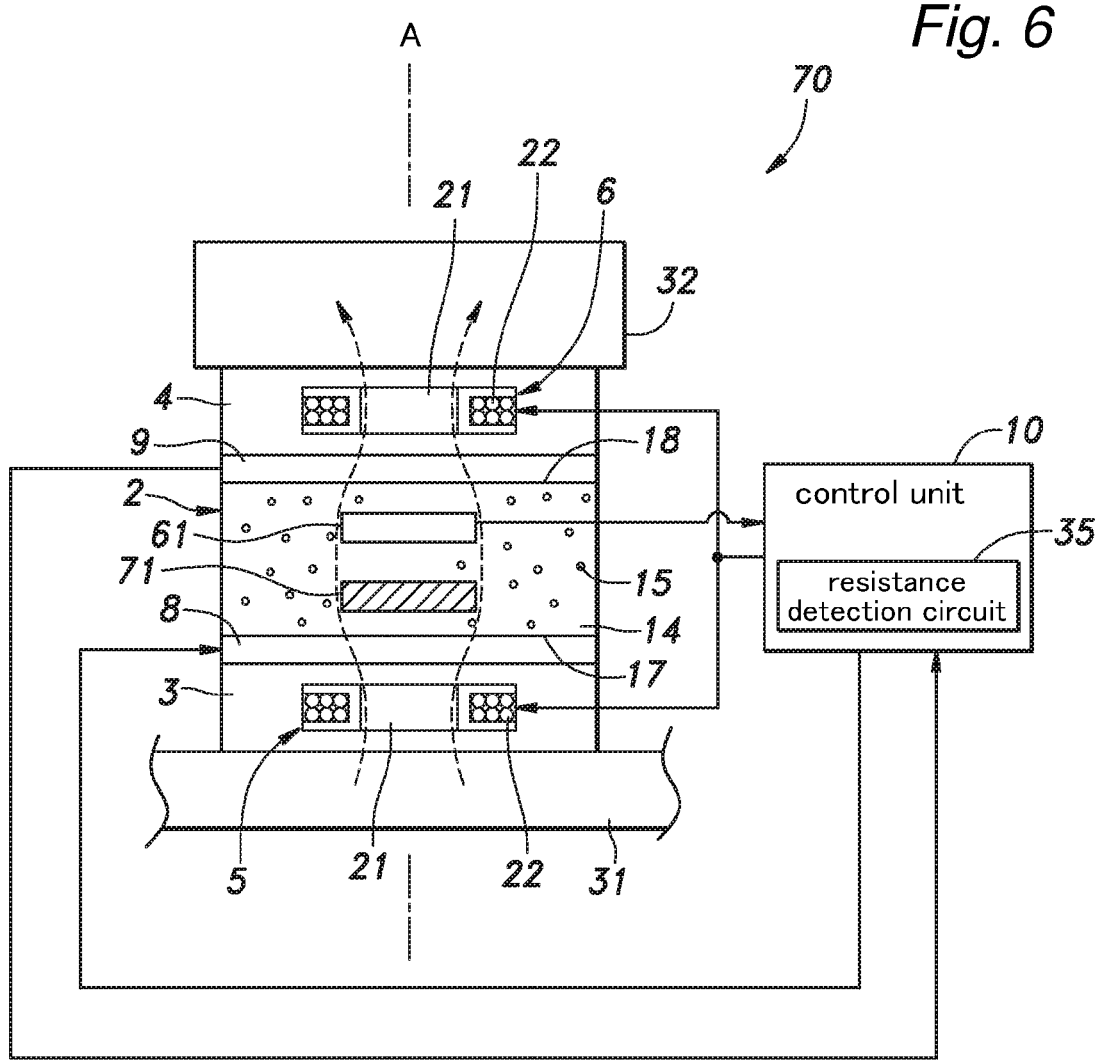
FIG. 6 is a diagram showing a sensor device given as a fourth embodiment of the present invention.

FIG. 6 is a diagram showing a sensor device 70 given as a fourth embodiment of the present invention. The sensor device 70 of the fourth embodiment differs from the sensor device 60 of the third embodiment in additionally having a non-magnetic member 71, but is otherwise similar to the sensor device 60 of the third embodiment. In the description of the sensor device 70 of the fourth embodiment, the parts corresponding to those of the sensor devices 1 and 60 of the foregoing embodiments are denoted with like numerals without necessarily repeating the description of such parts.

As shown in FIG. 6, the sensor device 70 of the fourth embodiment is provided with a non-magnetic member 71 inside the magnetic viscoelastic elastomer 2, in addition to the Hall device 61. The non-magnetic member 71 is made of material having a lower magnetic permeability than the magnetic viscoelastic elastomer 2 and the matrix elastomer 14. The non-magnetic member 71 is formed as a plate member having a major surface conformal to the major surface 19 of the Hall device 61, and is supported between the Hall device 61 and the first plate 3 in the magnetic viscoelastic elastomer 2. The non-magnetic member 71 is positioned such that the major surface thereof is perpendicular to the axial line A and the outer periphery coincides with the outer periphery of the Hall device 61 as seen in the direction of the axial line A. As a result, in the initial condition where the magnetic viscoelastic elastomer 2 is not deformed at all, the Hall device 61 is identically superimposed on the non-magnetic member 71 in the direction of the axial line A so that the area of the Hall device 61 opposing the electromagnets 5 and 6 in the first plate 3 is zero or at a minimum. Therefore, the magnetic flux lines produced from the electromagnets 5 and 6 are obstructed by the non-magnetic member 71 (as shown by the broken lines in FIG. 6), and are prevented from passing through the Hall device 61. In other words, in the initial condition where the magnetic viscoelastic elastomer 2 is not deformed at all, the detected magnetic field Bd detected by the Hall device 61 is at the minimum value.

In the sensor device 70 of the fourth embodiment having the structure discussed above, when the magnetic viscoelastic elastomer 2 has undergone a shear deformation, the Hall device 61 and the non-magnetic member 71 are displaced relative to each other in the shear direction so that the area by which the Hall device 61 opposes the electromagnets 5 and 6 increases. As a result, the magnetic flux that passes through the Hall device 61 increases relatively sharply, and this is detected by the Hall device 61. By thus interposing the non-magnetic member 71 between one of the electromagnets 5 and 6 and the Hall device 61, the changes in the magnetic field caused by the deformation and detected by the Hall device 61 can be magnified. In other words, the sensor device 70 is enabled to detect the deformation of the magnetic viscoelastic elastomer 2 at a high precision (high sensitivity).

Fifth Embodiment

Figure 7:
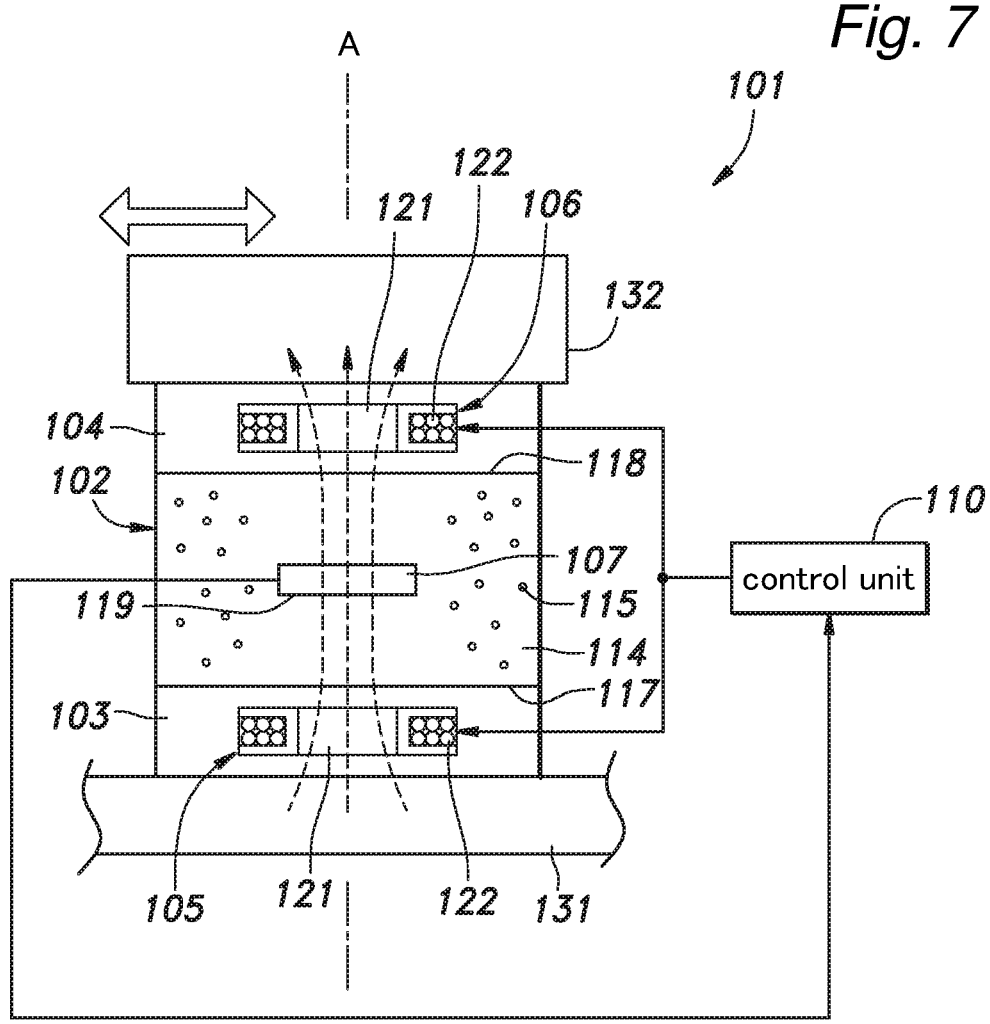
FIG. 7 is a diagram showing a sensor device given as a fifth embodiment of the present invention.
Figure 8:
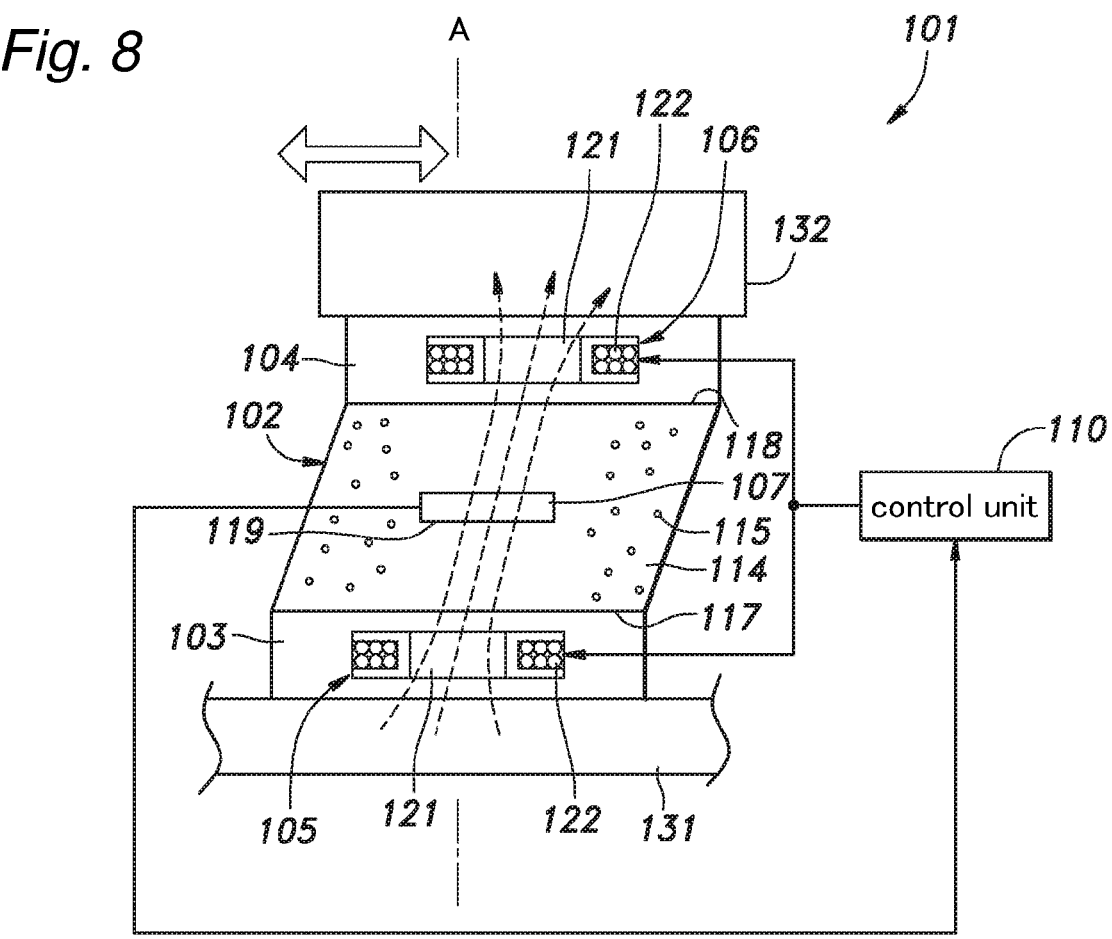
FIG. 8 is a diagram showing the sensor device of the fifth embodiment under loading.

FIG. 7 is a diagram showing a sensor device given as a fifth embodiment of the present invention, and FIG. 8 is a diagram of the sensor device of the fifth embodiment under loading. The sensor device 101 comprises a magnetic viscoelastic elastomer 102, a first plate 103 and a second plate 104 interposing the magnetic viscoelastic elastomer 102 therebetween, a first electromagnet 105 and a second electromagnet 106 provided on the first plate 103 and the second plate 104, respectively, as a means for applying a magnetic field, a Hall device 107 supported within the magnetic viscoelastic elastomer 102 as a magnetic field detection means, and a control unit 110.

The magnetic viscoelastic elastomer 102 includes a matrix elastomer 114 serving as a matrix with a viscoelastic property and magnetic particles 115 dispersed in the matrix elastomer 114. The matrix elastomer 114 may consist of per se known high polymer material having a viscoelastic property at room temperature such as ethylene-propylene rubber, butadiene rubber, isoprene rubber and silicone rubber. The matrix elastomer 114 is provided with a central axial line A, a first major surface 117 perpendicular to the central axial line A and defined on one exterior surface and a second major surface 118 parallel to the first major surface 117 and defined on an opposite exterior surface. The matrix elastomer 114 may be given with any shape such as a rectangular parallelepiped shape and a cylindrical shape. The first major surface 117 and the second major surface 118 consist of a pair of mutually opposing surfaces when the matrix elastomer 114 is given with a rectangular parallelepiped shape, and two end surfaces perpendicular to the axial line when the matrix elastomer 114 is given with a cylindrical shape.

The magnetic particles 115 have a property to be magnetically polarized under the action of a magnetic field, and may consist of per se known metals such as pure iron, soft electromagnetic iron, anisotropic silicon steel, Mn—Zn ferrite, Ni—Zn ferrite, magnetite, cobalt and nickel, per se known organic materials such as 4-methoxybenzylidien-4-acetoxyaniline and triaminobenzene polymer, or per se known organic/inorganic composite materials such as anisotropic plastic having ferrite particles dispersed therein. The possible shapes of each magnetic particle 115 may include but not limited to nodular, capillary and flaky shapes. The sizes of the magnetic particles may range between 0.01 µm to 500 µm although the present invention is not limited by such a range.

The magnetic particles 115 in the matrix elastomer 114 are subjected to a relatively small mutual interaction in absence of a magnetic field, but are subjected to a relatively strong mutual gravitational pull when placed in a magnetic field. Typically, the magnetic particles 115 are dispersed in the matrix elastomer 114 in such a manner that the contact between the magnetic particles 115 is insignificant when no magnetic field is applied thereto, but a heavier mutual contact occurs between the magnetic particles 15 owing to the magnetic coupling between the magnetic particles when a magnetic field is applied thereto. The magnetic particles 115 may be dispersed so as not to contact one another, or so as to form partly continuous chains in a magnetic field. The ratio of the volume of the magnetic particles 115 to that of the matrix elastomer 114 may be selected freely, but may range between 5% to 60%. The magnetic particles 115 may be evenly dispersed in the matrix elastomer 114, or may be dispersed unevenly such that localized high density or low density regions may be created.

The Hall device 107 consists of a per se known magnetic sensor for detecting a magnetic field by using the Hall effect. The Hall device 107 consists of a thin-film semiconductor device, and includes an input terminal for supplying and conducting a control current Ic along a major surface thereof in a first direction and an output terminal for receiving an output voltage Vo along the major surface in a second direction perpendicular to the first direction. When subjected to a magnetic field passing substantially perpendicular to the major surface 119, an output voltage Vo proportional to the magnetic flux of the magnetic field and the control current Ic is produced from the output terminal.

The Hall device 107 is buried in the central part of the magnetic viscoelastic elastomer 102 such that the major surface 119 thereof extends in parallel with the first and second major surfaces 117 and 118. In other words, the Hall device 107 is positioned such that the axial line A passes through the major surface 119 of the Hall device 107. The Hall device 107 is thus retained in the magnetic viscoelastic elastomer 102. The wiring connected to the input and output terminals of the Hall device 107 extends in parallel with the first and second major surfaces 117 and 118, and is drawn out from a side end of the magnetic viscoelastic elastomer 102.

The first plate 103 and the second plate 104 are made of non-magnetic material, and are bonded to the first major surface 117 and the second major surface 118 of the magnetic viscoelastic elastomer 102, respectively. The first electromagnet 105 and the second electromagnets 106 are each provided with an iron core 121 and a coil 122 wound around the outer circumference of the iron core 121. The first electromagnet 105 and the second electromagnets 106 are provided centrally in the first plate 103 and the second plate 104, respectively, so that the axial line of the coils 122 extend perpendicularly to the major surfaces of the first plate 103 and the second plate 104. Furthermore, the first electromagnet 105 and the second electromagnets 106 are positioned such that the axial line of the coils 122 coincide with the axial line A of the magnetic viscoelastic elastomer 102. In the illustrated embodiment, the first plate 103 and the second plate 104 are molded from plastic material such that the first electromagnet 105 and the second electromagnets 106 are insert molded in the first plate 103 and the second plate 104, respectively, during the molding process. In an alternate embodiment, each plate 103, 104 is formed as a hollow box member, and each electromagnet 105, 106 is thereafter placed in the interior of the corresponding plate member 103, 104. The lead wires of the coils 122 of the electromagnets 105 and 106 extend out of the plate members 103, 104.

By energizing the first electromagnet 105 and the second electromagnet 106, a magnetic field is produced in the magnetic viscoelastic elastomer 102. In this magnetic field, the magnetic flux lines (indicated by the broken lines in FIG. 7) are directed from the first electromagnet 105 of the first plate 103 to the second electromagnet 106 of the second plate 104. The magnetic field (applied magnetic field Bi) produced by the first electromagnet 105 and the second electromagnet 106 increases in intensity (magnetic flux density) in proportion to the electric current Ii conducted through the first electromagnet 105 and the second electromagnet 106. The greater the electric current is, the greater the magnetic field (magnetic flux density) becomes.

When a magnetic field is applied to the magnetic viscoelastic elastomer 102 by energizing the electromagnets 105 and 106, the magnetic particles 115 are magnetically polarized and form magnetic couplings. For instance, the magnetic particles 115 may couple with one another into chains so as to form a network structure, and this causes the apparent elastic modulus (stiffness) of the magnetic viscoelastic elastomer 102 to be greater than the intrinsic elastic modulus (stiffness) of the matrix elastomer 114. The greater the magnetic field applied to the magnetic viscoelastic elastomer 102 is, the greater the magnetic attraction between the magnetic particles 115 becomes, and the greater the elastic modulus of the magnetic viscoelastic elastomer 102 becomes. The greater the magnetic field (applied magnetic field Bi) that is applied to the magnetic viscoelastic elastomer 102 is, or the greater the electric current (Ii) supplied to the electromagnets 105 and 106 is, the greater the elastic modulus of the magnetic viscoelastic elastomer 102 becomes, and the less deformable the magnetic viscoelastic elastomer 102 becomes.

The first plate 103 of the sensor device 101 is fixedly attached to the base 131, and the second plate 104 thereof is fixedly attached to the measurement object 132. When a shear load F (directed along a plane perpendicular to the axial line A) is applied to the second plate 4 by the measurement object 32 as shown in FIG. 8, the sensor device 101 allows the magnitude of the load F and the deformation X of the magnetic viscoelastic elastomer 102 to be detected. This also means that the change rate of the load F, the change rate of the load F caused by the deformation X, the deformation rate V of the magnetic viscoelastic elastomer 102 and the frequency of the vibrations of the magnetic viscoelastic elastomer 102 can be detected.

The control unit 110 may be constructed by a microprocessor, or an LSI device or any other integrated electronic device incorporated with ROM and RAM. The control unit 110 is connected to the first and second electromagnets 105 and 106 and the Hall device 107. The control unit 110 supplies electric power to the first and second electromagnets 105 and 106, and can change the magnitude of the magnetic field (magnetic flux density) produced by the first and second electromagnets 105 and 106 by changing the electric current Ii supplied to these electromagnets 105 and 106. The electric current Ii supplied to the electromagnets 105 and 106 may be changed in a stepwise manner, or in a continuous manner. In the illustrated embodiment, the control unit 110 is configured to change the electric current Ii in three levels, small, medium and large, and the magnetic field (applied magnetic field Bi) produced by the electromagnets 105 and 106 can be changed in three levels, small, medium and large, in a manner corresponding to the electric current supplied thereto. When the control unit 110 is configured to change the electric current Ii supplied to the electromagnets 105 and 106 in a continuous manner, the magnetic field (applied magnetic field Bi) produced by the electromagnets 105 and 106 can be computed from the electric current Ii supplied to the electromagnets 105 and 106.

The control unit 110 not only supplies the control current Ic to the Hall device 107 but also receives the output voltage Vo from the Hall device 107. The control unit 110 computes the magnetic field (detected magnetic field Bd) that is applied to the Hall device 107 from the control current Ic and the output voltage Vo.

The control unit 110 looks up a prescribed map according to the detected magnetic field Bd and the applied magnetic field Bi to compute the deformation X of the magnetic viscoelastic elastomer 102, the load F acting upon the magnetic viscoelastic elastomer 102 and the frequency v of the vibration of the magnetic viscoelastic elastomer 102. When computing the deformation and other variables of the magnetic viscoelastic elastomer 102, the control unit 110 may use the control current Ic and the output voltage Vo of the Hall device 107 corresponding to the detected magnetic field Bd, instead of using the detected magnetic field Bd itself, and may use the electric current Ii supplied to the electromagnets 105 and 106 to produce the applied magnetic field Bi, instead of using the applied magnetic field Bi.

The relationship between the applied magnetic field, the load and the deformation in the sensor device 101 of the fifth embodiment is also shown in FIG. 3. As the applied magnetic field Bi changes, the degree of magnetic coupling between the magnetic particles 115 changes and the elastic modulus of the magnetic viscoelastic elastomer 102 changes. The stronger the applied magnetic field Bi is, the greater the magnetic coupling between the magnetic particles 115 becomes, and the greater the elastic modulus of the magnetic viscoelastic elastomer 102 becomes. Thus, as shown in FIG. 3, as the applied magnetic field Bi is increased, the deformation X of the magnetic viscoelastic elastomer 102 for a given change in the load F decreases. Therefore, the weaker the applied magnetic field Bi is, the smaller the load under which a deformation limit value X1 is reached becomes. The deformation limit value X1 as used herein means a value of the deformation beyond which the linearity in the relationship between the load F and the deformation X is lost. It is desirable that the sensor device 101 operates in the range where the deformation X of the magnetic viscoelastic elastomer 102 is within the deformation limit value X1. A stopper may be provided to limit the relative displacement between the first plate 103 and the second plate 104 below a prescribed value so that the deformation X of the magnetic viscoelastic elastomer 102 is maintained below the deformation limit value X1.

The Hall device 107 produces an output voltage Vo which corresponds to the magnitude of the magnetic field (detected magnetic field Bd) at the position thereof. Suppose that the magnetic viscoelastic elastomer 102 is subjected to a constant magnetic field (applied magnetic field Bi) generated by the electromagnets 105 and 106, and a load F is applied to the magnetic viscoelastic elastomer 102 via the second plate 104. The resulting deformation of the magnetic viscoelastic elastomer 102 causes the position of the Hall device 107 relative to the electromagnets 105 and 106 to change, and this in turn causes the number of the magnetic flux lines passing through the Hall device 107 to change so that the output voltage Vo of the Hall device 107 or the magnitude of the magnetic field (detected magnetic field Bd) detected by the Hall device 107 changes in a corresponding manner. Therefore, based on the changes in the detected magnetic field Bd (output voltage Vo) detected by the Hall device 107, the deformation X of the magnetic viscoelastic elastomer 102 and the load F acting upon the magnetic viscoelastic elastomer 102 can be computed. In the illustrated embodiment, because the Hall device 107 is located in the central part of the magnetic viscoelastic elastomer 102 on the axial line A such that the axial line of the electromagnets 105 and 106 (the coils 122 thereof) coincides with the axial line A in the neutral condition, as the magnetic viscoelastic elastomer 102 undergoes a shear deformation, the Hall device 107 deviates from the axial line of the electromagnets 105 and 106, and the detected magnetic field Bd decreases in a progressive manner.

Because the detected magnetic field Bd varies not only depending on the deformation X of the magnetic viscoelastic elastomer 102 but also depending on the magnitude of the applied magnetic field Bi caused the electromagnets 105 and 106, when computing the deformation X of the magnetic viscoelastic elastomer 102, it is necessary to take into account both the detected magnetic field Bd and the applied magnetic field Bi. In the illustrated embodiment, the applied magnetic field Bi can be changed in three levels, weak, medium and strong, and the control unit 110 is incorporated with deformation maps defining the relationship between the detected magnetic field Bd and the deformation X of the magnetic viscoelastic elastomer 102 for three different levels of the applied magnetic field Bi. The control unit 110 computes the deformation X of the magnetic viscoelastic elastomer 102 by looking up the deformation map according to the applied magnetic field Bi and the detected magnetic field Bd. The deformation map is configured, for instance, such that the deformation X of the magnetic viscoelastic elastomer 102 becomes greater with a decrease in the detected magnetic field Bd, and becomes greater with an increase in the applied magnetic field Bi.

As can be seen from FIG. 3, the load F acting upon the magnetic viscoelastic elastomer 102 is correlated to the deformation X of the magnetic viscoelastic elastomer 102 and the magnetic field Bi in a certain way. Because the applied magnetic field Bi can be varied in three levels, weak, medium and strong, the control unit 110 of the illustrated embodiment is provided with three load maps defining the relationship between the deformation X of the magnetic viscoelastic elastomer 102 and the load acting upon the magnetic viscoelastic elastomer 102 in a corresponding manner. The control unit 110 computes the load F acting upon the magnetic viscoelastic elastomer 102 by looking up one of the load maps according to the applied magnetic field Bi and the deformation X of the magnetic viscoelastic elastomer 102. The load maps are typically configured such that the load F increases with an increase in the deformation X, and the load F for a given deformation X increases with an increase in the applied magnetic field Bi.

The control unit 110 can obtain the deformation speed V of the magnetic viscoelastic elastomer 102 by differentiating the computed deformation X, and can determine the frequency v of the vibration of the magnetic viscoelastic elastomer 102 from the deformation speed V. The control unit 110 can also determine the change rate of the load F and the frequency of the change in the load F according to the detected load F.

The control unit 110 is also configured to adjust the applied magnetic field Bi according to the deformation X of the magnetic viscoelastic elastomer 102. For instance, when the deformation X is relatively large, the electric current Ii supplied to the electromagnets 105 and 106 is increased in order to strengthen the magnetic field Bi and thereby increase the elastic modulus of the magnetic viscoelastic elastomer 102. As a result, the deformation X is prevented from readily reaching the deformation limit value X1 so that a relatively large load F can be measured. In other words, the detection range (measurement range) of the sensor device 101 is expanded. When the deformation X is relatively small, the control unit 110 weakens the applied magnetic field Bi so that the elastic modulus of the magnetic viscoelastic elastomer 102 is reduced. As a result, the magnetic viscoelastic elastomer 102 is caused to deform more readily even when the load F applied thereto is relatively small so that the changes in the detected magnetic field Bd for a given load F can be increased, and the detection precision (sensitivity) increases. Thus, the sensor device 101 can change the detection range and the detection sensitivity depending on the deformation X of the magnetic viscoelastic elastomer 102 and the applied load F.

The adjustment of the detection range and the detection sensitivity of the sensor device 101 can also be based on the deformation speed V of the magnetic viscoelastic elastomer 102 and/or the change or the change rate of the detected magnetic field Bd, instead of the deformation X of the magnetic viscoelastic elastomer 102. The greater the deformation speed V of the magnetic viscoelastic elastomer 102 is, or the greater the change rate (change speed) of the detected magnetic field Bd is, the greater the applied magnetic field Bi should be, or the greater the elastic modulus of the magnetic viscoelastic elastomer 102 should be made.

The sensor device 101 having the structure discussed above can also be used as an actuator for reducing the vibrations of the measurement object 132 by changing the elastic modulus of the magnetic viscoelastic elastomer 102 according to the computed load F and the vibration frequency v of the magnetic viscoelastic elastomer 102 computed from the change rate of the load F. For instance, by changing the elastic modulus of the magnetic viscoelastic elastomer 102, the spring constant or the resonant vibration frequency of the spring mass system of the assembly consisting of the base 131, the sensor device 101 and the measurement object 132 can be changed so that the vibration of the spring mass system can be controlled. In such a case, the sensor device 101 may be configured such that the elastic modulus of the magnetic viscoelastic elastomer 102 is changed in the direction to lower the frequency of the vibration according to the vibration frequency v detected by the sensor device 101.

Thus, the sensor device 101 of the illustrated embodiment can perform the functions of a sensor and an actuator. Normally, actuators and sensors are constructed from different component parts, but by using the magnetic viscoelastic elastomer 102 and the electromagnets 105 and 106 as common component parts to both a sensor and an actuator, the number of component parts of the sensor device 101 can be reduced, and the sensor device 101 can be constructed as a compact unit.

As the sensor device 101 uses a magnetic viscoelastic elastomer 102 as a main component, the sensor device 101 can be conveniently incorporated or substituted in devices which use viscoelastic elastomer as a buffering or shock absorbing component.

The sensor device 101 having the structure discussed above can be used as an engine mount interposed between a vehicle body frame and an engine, and a bush interposed between a suspension arm and a knuckle supporting a wheel. For instance, the base 131 may be attached to the vehicle body frame or the suspension arm, and the measurement object 132 may consist of a part of the engine or the knuckle. When the sensor device 101 is used as an engine mount, the sensor device 101 may be configured to change the elastic modulus of the magnetic viscoelastic elastomer 102 so as to control the vibrations of the engine by detecting the vibrations of the engine. When the sensor device 101 is applied to a tubular bush, the magnetic viscoelastic elastomer 102 is formed as a tubular member, and the first plate 103 may be formed as an outer tube fitted onto the outer circumferential surface of the magnetic viscoelastic elastomer 102 while the second plate 104 is formed as an inner tube fitted into the inner circumferential surface of the magnetic viscoelastic elastomer 102.

Sixth Embodiment

Figure 9:
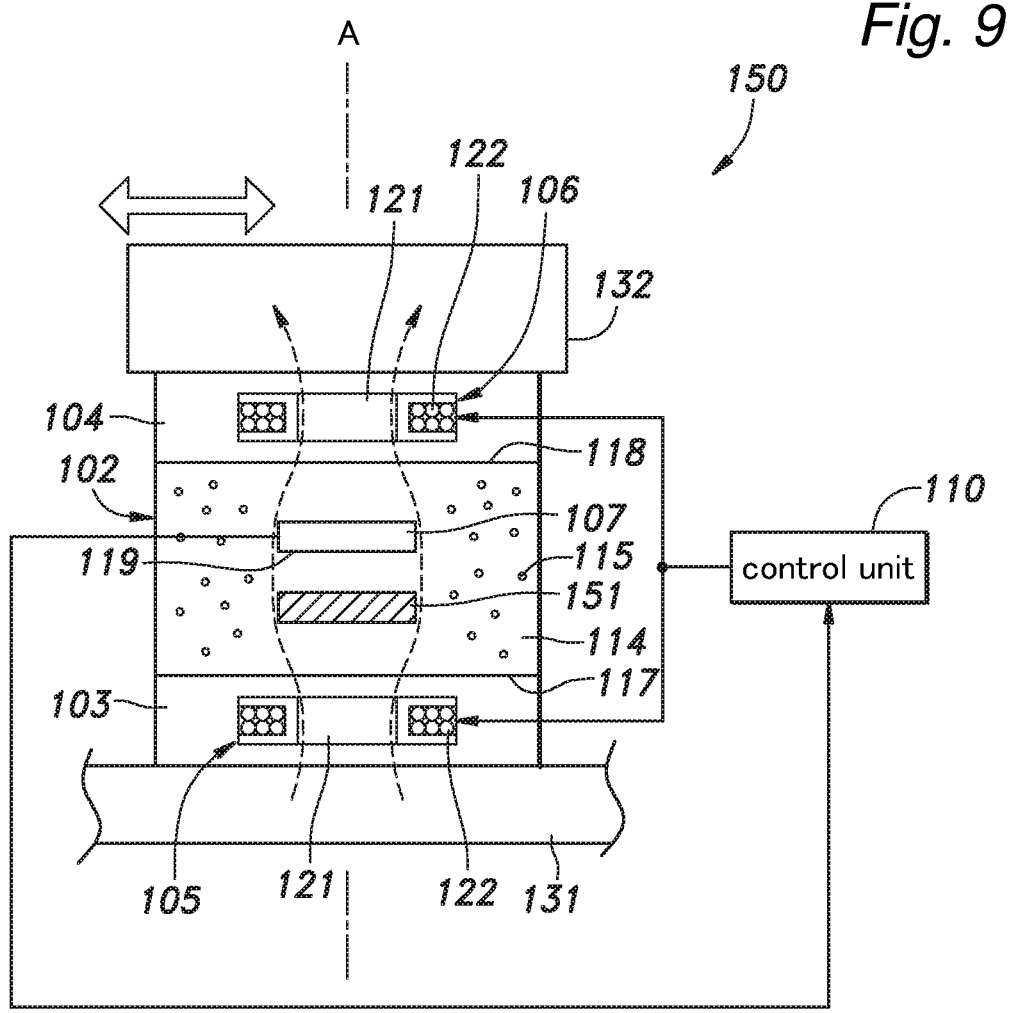
FIG. 9 is a diagram showing a sensor device given as a sixth embodiment of the present invention.

FIG. 9 is a diagram showing a sensor device 150 given as a sixth embodiment of the present invention. The sensor device 150 of the sixth embodiment differs from the sensor device 101 of the fifth embodiment in additionally having a non-magnetic member 151, but is otherwise similar to the sensor device 101 of the fifth embodiment. In the description of the sensor device 150 of the sixth embodiment, the parts corresponding to those of the sensor device 101 of the fifth embodiment are denoted with like numerals without necessarily repeating the description of such parts.

As shown in FIG. 9, the sensor device 150 of the sixth embodiment is provided with a non-magnetic member 151 inside the magnetic viscoelastic elastomer 102, in addition to the Hall device 107. The non-magnetic member 151 is made of material having a lower magnetic permeability than the magnetic viscoelastic elastomer 102 and the matrix elastomer 114. The non-magnetic member 151 is formed as a plate member having a major surface conformal to the major surface 119 of the Hall device 107, and is supported between the Hall device 107 and the first plate 103 in the magnetic viscoelastic elastomer 102. The non-magnetic member 151 is positioned such that the major surface thereof is perpendicular to the axial line A and the outer periphery coincides with the outer periphery of the Hall device 107 as seen in the direction of the axial line A. As a result, in the initial condition where the magnetic viscoelastic elastomer 102 is not deformed at all, the Hall device 107 is identically superimposed on the non-magnetic member 151 in the direction of the axial line A so that the area of the Hall device 107 opposing the electromagnets 105 and 106 in the first plate 103 is zero or at a minimum. Therefore, the magnetic flux lines produced from the electromagnets 105 and 106 are obstructed by the non-magnetic member 151 (as shown by the broken lines in FIG. 10), and are prevented from passing through the Hall device 107. In other words, in the initial condition where the magnetic viscoelastic elastomer 102 is not deformed at all, the detected magnetic field Bd detected by the Hall device 107 is at the minimum value.

In the sensor device 101 of the sixth embodiment having the structure discussed above, when the magnetic viscoelastic elastomer 102 has undergone a shear deformation, the Hall device 107 and the non-magnetic member 151 are displaced relative to each other in the shear direction so that the area by which the Hall device 107 opposes the electromagnets 105 and 106 increases. As a result, the magnetic flux that passes through the Hall device 107 increases relatively sharply, and this is detected by the Hall device 107. By thus interposing the non-magnetic member 151 between one of the electromagnets 105 and 106 and the Hall device 107, the changes in the magnetic field caused by the deformation and detected by the Hall device 107 can be magnified. In other words, the sensor device 101 is enabled to detect the deformation of the magnetic viscoelastic elastomer 102 at a high precision (high sensitivity).

Seventh Embodiment

Figure 10:
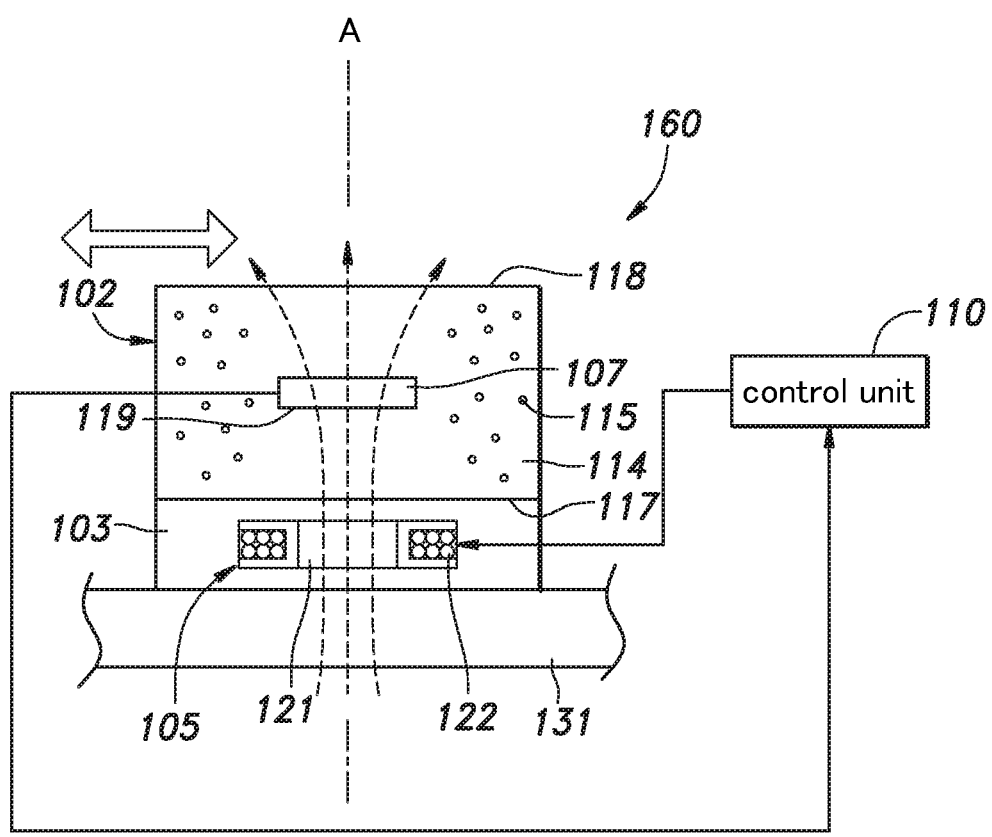
FIG. 10 is a diagram showing a sensor device given as a seventh embodiment of the present invention.

FIG. 10 is a diagram showing a sensor device 160 given as a seventh embodiment of the present invention. The sensor device 160 of the seventh embodiment differs from the sensor device 101 of the fifth embodiment in doing away with the second plate 104 and the second electromagnets 106 contained in the second plate 104, but is otherwise similar to the sensor device 101 of the fifth embodiment. In the description of the sensor device 160 of the seventh embodiment, the parts corresponding to those of the sensor device 101 of the fifth embodiment are denoted with like numerals without necessarily repeating the description of such parts.

As shown in FIG. 10, in the sensor device 160 of the seventh embodiment, the second plate 104 and the second electromagnets 106 contained in the second plate 104 are omitted, and the load input portion of the sensor device 160 consists of the magnetic viscoelastic elastomer 102. Therefore, the sensor device 160 is formed as a pressure sensitive sensor having a soft (elastic) load input portion.

The sensor device 160 of the seventh embodiment is suitable for use in a button switch operated by human fingers and the working end (such as fingers) of the arm of a robot.

The present invention has been described in terms of specific embodiments, but the present invention is not limited by such embodiments, and can be modified freely without departing from the spirit of the present invention. For instance, one of the first and second electromagnets 105 and 106 in the first to third embodiments, and the fifth embodiment can be omitted. The magnetic field application means in the foregoing embodiments consisted of electromagnets 5, 6, 105 and 106, but may also consist of permanent magnets. In such a case, the magnitude of the magnetic field applied to the magnetic viscoelastic elastomer 2 and 102 can be varied by using a magnet position varying means for changing the relative position between the permanent magnet and the magnetic viscoelastic elastomer 2, 102.

GLOSSARY

1, 50, 60, 70, 101, 150, 160 sensor device
2, 102 magnetic viscoelastic elastomer
3, 103 first plate
4, 104 second plate
5, 105 first electromagnet (magnetic field application means)
6, 106 second electromagnet (magnetic field application means)
8 first electrode plate
9 second electrode plate
10, 110 control unit (computation means)
14, 114 matrix elastomer
15, 115 magnetic particle
31, 131 base
32, 132 measurement object
35 electric resistance detection circuit
51 stopper
61, 161 Hall device (magnetic detection means)
71, 151 non-magnetic member
A axial line

The invention claimed is:

1. A sensor device, comprising:
   a magnetic viscoelastic elastomer containing electroconductive magnetic particles dispersed therein so as to demonstrate an elastic modulus that varies depending on a magnetic field applied thereto and an electric resistance in a prescribed direction that varies depending on a deformation thereof;
   a magnetic field application unit for applying a magnetic field that can be varied to the magnetic viscoelastic elastomer;
   a resistance detection unit for detecting the electric resistance of the magnetic viscoelastic elastomer; and
   a computation unit for computing a load applied to the magnetic viscoelastic elastomer according to a detection value of the resistance detection unit and a magnitude of the magnetic field applied by the magnetic field application unit, the computation unit being configured such that the greater the magnitude of the magnetic field applied by the magnetic field application unit is, the greater the value of the load computed for a given detection value of the resistance detection unit is.

2. The sensor device according to claim 1, wherein the resistance detection unit includes a pair of electrodes each having a major surface perpendicular to a first direction and interposing the magnetic viscoelastic elastomer therebetween, the resistance detection unit being configured to measure an electric resistance of the magnetic viscoelastic elastomer by conducting an electric current between the electrodes; and
   wherein the computation unit is configured to determine that the magnetic viscoelastic elastomer has undergone a compressive deformation in the first direction when the electric resistance has decreased, and that the magnetic viscoelastic elastomer has undergone a tensile deformation in the first direction or a shear deformation along a plane perpendicular to the first direction when the electric resistance has increased.

3. The sensor device according to claim 2, further comprising a limiting member for limiting the shear deformation of the magnetic viscoelastic elastomer.

4. The sensor device according to claim 2, further comprising a magnetic field detection unit provided in the magnetic viscoelastic elastomer;
   wherein the magnetic field application unit is positioned such that magnetic flux lines produced from the magnetic field application unit is directed in the first direction; and
   wherein the computation unit is configured to detect a shear deformation of the magnetic viscoelastic elastomer in a direction perpendicular to the first direction according to a detection value of the magnetic field detection unit and a magnitude of the magnetic field applied by the magnetic field application unit.

5. The sensor device according to claim 1, wherein the magnetic field application unit is configured to apply a magnetic field of a greater magnitude with an increase in a change in the detection value of the resistance detection unit.

6. The sensor device according to claim 1, wherein the magnetic field application unit is configured to apply a magnetic field of a greater magnitude with an increase in a deformation or a deformation speed of the magnetic viscoelastic elastomer computed by the computation unit.

7. The sensor device according to claim 1, wherein the magnetic viscoelastic elastomer is interposed between a first member and a second member, and the sensor device is configured to change the elastic modulus of the magnetic viscoelastic elastomer by controlling the magnetic field application unit according to the load applied to the magnetic viscoelastic elastomer or a frequency of a vibration of the magnetic viscoelastic elastomer computed by the computation unit so that a load or a vibration transmitted between the first and second members may be varied.

8. The sensor device according to claim 1, wherein the magnetic field application unit consists of an electromagnet.

9. A sensor device, comprising:
- a magnetic viscoelastic elastomer containing electroconductive magnetic particles dispersed therein so as to demonstrate an elastic modulus that varies depending on a magnetic field applied thereto;
- a magnetic field application unit for applying a magnetic field that can be varied to the magnetic viscoelastic elastomer;
- a magnetic field detection unit supported by the magnetic viscoelastic elastomer so as to change a position thereof relative to the magnetic field application unit in dependence on a deformation of the magnetic viscoelastic elastomer; and
- a computation unit for computing at least one of a deformation state of the magnetic viscoelastic elastomer and a load applied to the magnetic viscoelastic elastomer according to a magnitude of the magnetic field detected by the magnetic field detection unit and a magnitude of the magnetic field applied by the magnetic field application unit.

10. The sensor device according to claim 9, wherein the computation unit is configured to increase a value of the computed load for a given detection value of the magnetic field detection unit with an increase in the magnetic field applied by the magnetic field application unit.

11. The sensor device according to claim 9, wherein the computation unit is configured to increase the magnetic field applied by the magnetic field application unit with an increase in a change of the magnetic field detected by the magnetic field detection unit.

12. The sensor device according to claim 9, wherein the computation unit is configured to increase the magnetic field applied by the magnetic field application unit with an increase in the deformation or a deformation speed of the magnetic viscoelastic elastomer computed by the computation unit.

13. The sensor device according to claim 9, wherein the magnetic viscoelastic elastomer is interposed between a first member and a second member, and the computation unit is configured to change the elastic modulus of the magnetic viscoelastic elastomer by controlling the magnetic field application unit according to at least one of the load applied to the magnetic viscoelastic elastomer, the deformation of the magnetic viscoelastic elastomer and a deformation speed of the magnetic viscoelastic elastomer computed by the computation unit so that a load or a vibration transmitted between the first and second members may be varied.

14. The sensor device according to claim 9, wherein the magnetic field application unit consists of an electromagnet, and the magnetic field detection unit is a Hall device supported within the magnetic viscoelastic elastomer.

15. The sensor device according to claim 14, further comprising a non-magnetic member positioned between the electromagnet and the Hall device so that magnetic flux lines directed from the electromagnet to the Hall device are at least partly obstructed, and a relative position between the non-magnetic member and the Hall device changes by a deformation of the magnetic viscoelastic elastomer.

* * * * *